(12) United States Patent
You et al.

(10) Patent No.: US 7,690,403 B2
(45) Date of Patent: Apr. 6, 2010

(54) AUTOMATIC LIQUID DISPENSER AND AUTOMATIC LIQUID DISPENSING METHOD

(75) Inventors: Dong Joo You, Seoul (KR); Ju Hwan Yun, Seoul (KR); Jong Hwan Kim, Seoul (KR); Young Hyun Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 159 days.

(21) Appl. No.: 11/924,332

(22) Filed: Oct. 25, 2007

(65) Prior Publication Data

US 2008/0105331 A1    May 8, 2008

(30) Foreign Application Priority Data

| Nov. 7, 2006 | (KR) | ...................... 10-2006-0109384 |
| Jan. 19, 2007 | (KR) | ...................... 10-2007-0006047 |
| Feb. 23, 2007 | (KR) | ...................... 10-2007-0018716 |
| Mar. 5, 2007 | (KR) | ...................... 10-2007-0021464 |

(51) Int. Cl.
    *B65B 1/30*    (2006.01)

(52) U.S. Cl. .......................... 141/83; 141/198; 141/360

(58) Field of Classification Search .................... 141/83, 141/94–96, 192, 198, 351, 360; 73/290 R, 73/1.73
See application file for complete search history.

(56) References Cited

U.S. PATENT DOCUMENTS

| 3,847,016 | A | * | 11/1974 | Ziedonis | ..................... 600/453 |
| 4,572,253 | A | * | 2/1986 | Farmer et al. | .................. 141/95 |
| 4,917,155 | A | * | 4/1990 | Koblasz et al. | .................. 141/1 |
| 5,454,406 | A | * | 10/1995 | Rejret et al. | ................... 141/1 |
| 5,491,333 | A | * | 2/1996 | Skell et al. | ............... 250/222.1 |
| 5,744,793 | A | * | 4/1998 | Skell et al. | ............... 250/222.1 |
| 5,862,844 | A | * | 1/1999 | Perrin | ........................ 141/351 |
| 6,003,569 | A | * | 12/1999 | Williams | .................... 141/362 |
| 6,046,447 | A | * | 4/2000 | Skell et al. | ............... 250/222.1 |
| 6,082,419 | A | * | 7/2000 | Skell et al. | .................. 141/198 |
| 6,227,265 | B1 | * | 5/2001 | Skell et al. | .................. 141/198 |
| 6,394,153 | B2 | * | 5/2002 | Skell et al. | .................. 141/351 |
| 6,789,585 | B1 | * | 9/2004 | Janke | ......................... 141/198 |
| 7,028,725 | B2 | * | 4/2006 | Hooker | ........................ 141/141 |
| 2008/0190514 | A1 | * | 8/2008 | Lee et al. | ....................... 141/95 |
| 2008/0264092 | A1 | * | 10/2008 | Chase et al. | .................. 62/389 |

FOREIGN PATENT DOCUMENTS

| JP | 2003162766 | 6/2003 |
| KR | 20050007194 | 1/2005 |

* cited by examiner

*Primary Examiner*—Gregory L Huson
*Assistant Examiner*—Jason K Niesz
(74) *Attorney, Agent, or Firm*—Birch, Stewart, Kolasch & Birch, LLP

(57) ABSTRACT

An automatic liquid dispenser and automatic liquid dispensing method are disclosed capable of transmitting ultrasonic to an upper surface of a receptacle, and receiving the ultrasonic reflected from the upper surface of the receptacle to detect a receptacle height, whereby the receptacle height may be freely detected regardless of shape, material and surface state of the receptacle, and regardless of a position where the receptacle is placed.

30 Claims, 18 Drawing Sheets

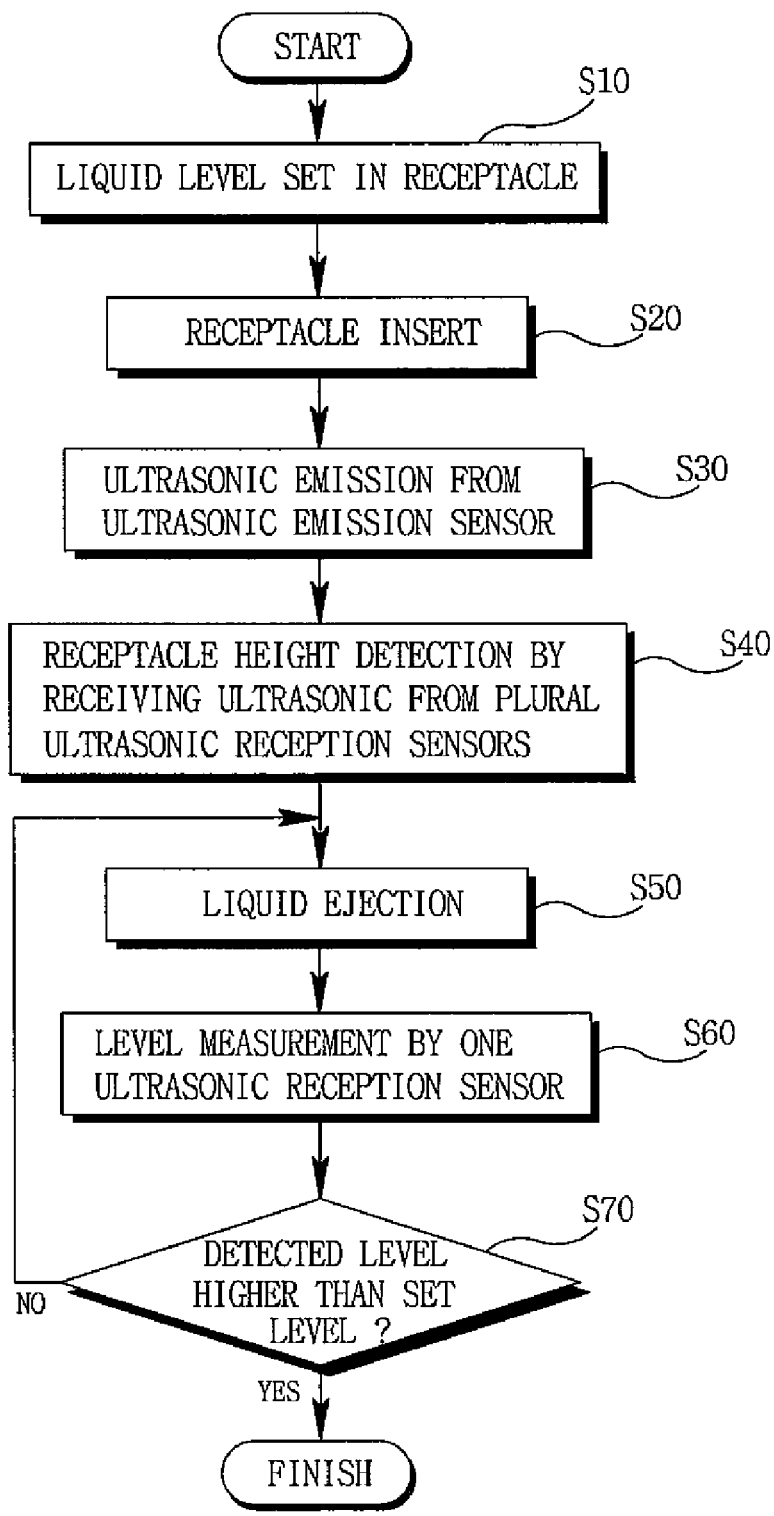

AUTOMATIC LIQUID DISPENSER AND AUTOMATIC LIQUID DISPENSING METHOD

CROSS-REFERENCE TO RELATED APPLICATION

The present application is based on, and claims priorities from, Korean Application Numbers 10-2006-0109384 filed Nov. 7, 2006, 10-2007-0006047 filed Jan. 19, 2007, 10-2007-0018716 filed Feb. 23, 2007 and 10-2007-0021464 filed Mar. 5, 2007, disclosures of which are incorporated by reference herein in its entirety.

BACKGROUND

The disclosed technique relates to automatic liquid dispensers. In general, liquid dispensers are installed on refrigerators and water purifiers to allow a user to readily extract liquid stored therein. Particularly, liquid dispensers mounted on refrigerators are so designed as to allow a user to extract liquid therethrough from outside without recourse to opening of a door of the refrigerators.

FIG. 1 is a perspective view illustrating a state where a liquid dispenser is mounted on a refrigerator according to prior art. A door 110 of a refrigerator 100 is frontally mounted with a liquid dispenser 120.

The liquid dispenser 120 is disposed with a receptacle accommodator 130, and a liquid ejecting key (not shown) for ejecting the liquid is installed inside the liquid dispenser 120. When a user inserts a receptacle 140 into the receptacle accommodator 130 of the liquid dispenser 120 mounted on the front surface of a door 110 of the refrigerator 100, and presses the liquid ejecting key, the liquid may be ejected into the receptacle 140 only during a time the liquid ejecting key is depressed.

If a liquid dispenser is mounted on a refrigerator, there is no need of opening a door of the refrigerator, such that coolness inside the refrigerator may not be leaked outside to thereby reduce power consumption of the refrigerator, and to further lengthen or maintain the freshness of foods stored inside the refrigerator.

Development of automatically dispensed liquid dispensers has been recently attempted, largely with a view to providing a user convenience.

SUMMARY

A first object is to provide an automatic liquid dispenser and automatic liquid dispensing method capable of transmitting ultrasonic to an upper surface of a receptacle, and receiving the ultrasonic reflected from the upper surface of the receptacle to detect a receptacle height, whereby the receptacle height may be freely detected regardless of shape, material and surface state of the receptacle, and regardless of a position where the receptacle is placed.

A second object is to provide an automatic liquid dispenser and automatic liquid dispensing method capable of using ultrasonic to reduce a manufacturing cost thereof compared with that of using light.

A third object is to provide an automatic liquid dispenser and automatic liquid dispensing method adapted to mount a receptacle arranger capable of precisely arranging a receptacle under a nozzle on a receptacle accommodator, whereby liquid ejected from the nozzle may be inputted only into the receptacle placed on the receptacle accommodator to thereby prevent liquid from being splashed.

In one general aspect, an automatic liquid dispenser includes a receptacle height measurer generating ultrasonic onto an upper surface of a receptacle and receiving the ultrasonic reflected from the upper surface of the receptacle to generate a signal, a liquid level detector measuring a level of content inside the receptacle, liquid ejector ejecting liquid inside the receptacle, and a controller controlling the liquid ejector using the signal generated by the liquid level detector or the liquid ejector.

In another general aspect, an automatic liquid dispensing method includes emitting ultrasonic to an upper surface of a receptacle and receiving the ultrasonic reflected from the upper surface of the receptacle to measure a receptacle height, ejecting liquid into the receptacle, receiving the ultrasonic reflected from an upper surface of the liquid to measure a liquid level, and stopping the liquid ejection if the detected liquid level reaches a predetermined value.

In still another general aspect, an automatic liquid dispenser includes a liquid ejector ejecting liquid into a receptacle, a first ultrasonic sensor sensing a receptacle height, a second ultrasonic sensor sensing a level of the liquid inside the receptacle, and a controller determining the receptacle height using a signal sensed by the first ultrasonic sensor, deciding a level of liquid inputtable into the receptacle responsive to the determined receptacle height, and determining the level of the liquid inputted into the receptacle using a signal sensed by the second ultrasonic sensor to thereby control an operation of the liquid ejector.

BRIEF DESCRIPTION OF THE DRAWINGS

FIG. 6 is a flowchart illustrating a method for driving an automatic liquid dispenser according to the first implementation.

DETAILED DESCRIPTION

The features and nature of this description will become more apparent from the detailed description set forth below when taken in conjunction with the drawings.

Figure 1:
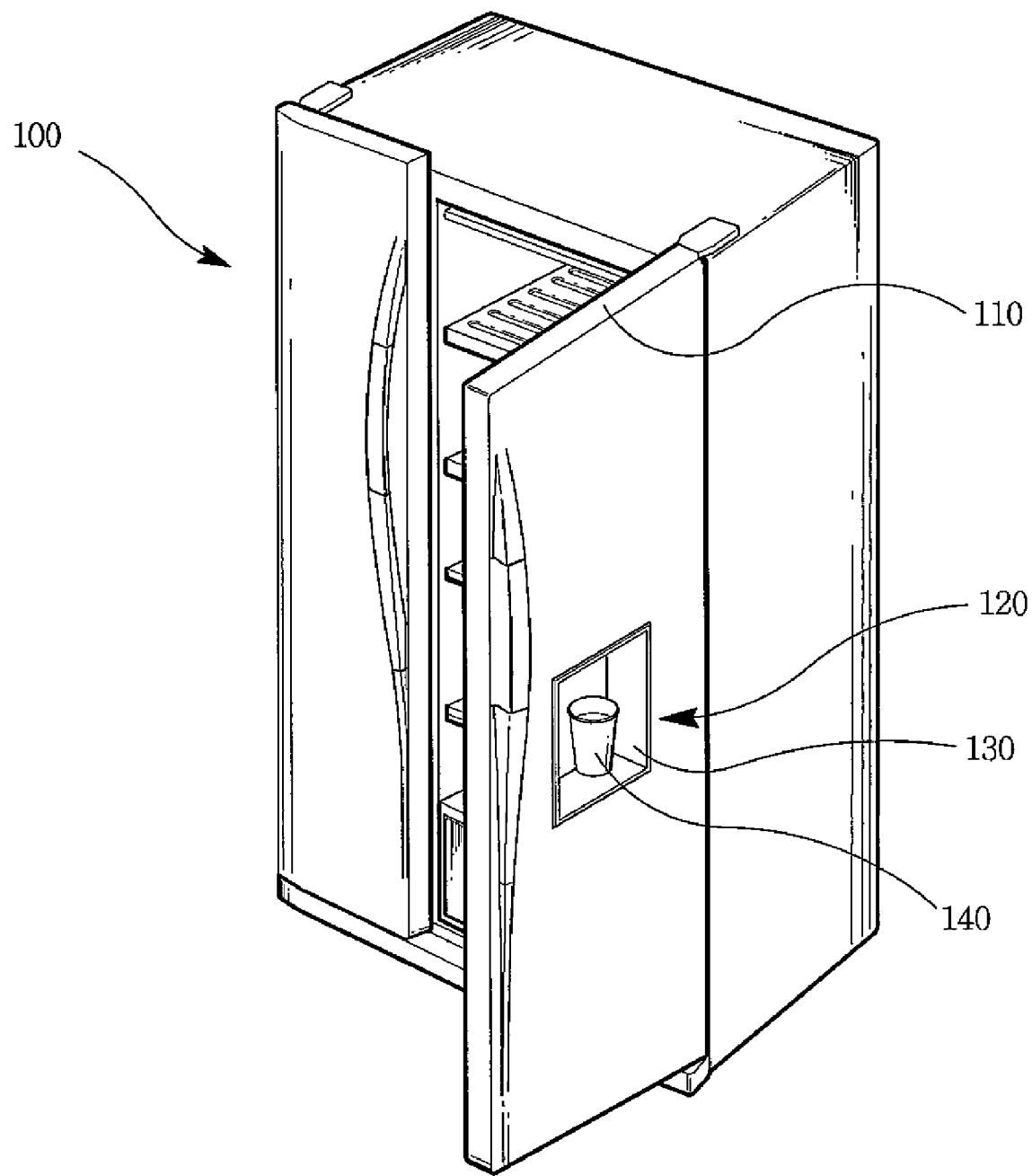
FIG. 1 is a perspective view illustrating a state where a liquid dispenser is disposed in a refrigerator according to prior art.
Figure 2:
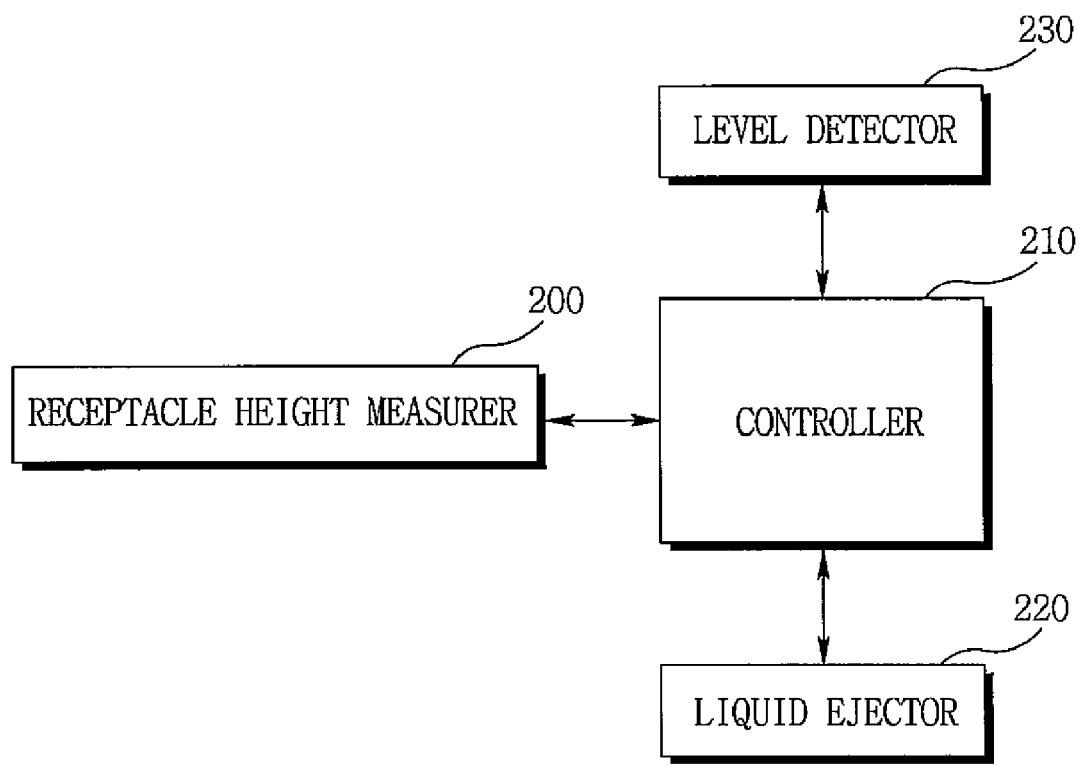
FIG. 2 is a schematic block diagram illustrating an automatic liquid dispenser according to a first exemplary implementation.

FIG. 2 is a schematic block diagram illustrating an automatic liquid dispenser according to a first exemplary implementation, wherein the automatic liquid dispenser includes a receptacle height measurer 200 emitting ultrasonic onto an upper surface of a receptacle and receiving the ultrasonic reflected from the upper surface of the receptacle to generate a signal, a controller 210 outputting a control signal relative to the signal generated by the receptacle height measurer 200, a liquid ejector 220 ejecting liquid to the receptacle in response to the control signal of the controller 210, and a level detector 230 detecting a level of liquid inside the receptacle in response to the control signal from the controller 210.

The level detector 230 measures the level of content inside the receptacle.

An automatic liquid dispensing method in the automatic liquid dispenser thus described is such that ultrasonic is emitted from the receptacle height measurer 200 to an upper surface of the receptacle, and the ultrasonic reflected from the upper surface of the receptacle is received and a signal is generated by the receptacle height measurer 200 when a user inputs the receptacle.

Successively, the signal generated by the receptacle height measurer 200 is inputted into the controller 210 which in turn outputs a control signal to the liquid ejector 220 and the level detector 230.

When the control signal of the controller 210 is inputted, the liquid ejector 220 ejects the liquid to the receptacle, and the same time, the level detector 230 detects the level of the liquid ejected into the receptacle in real time.

At this time, if the level of the liquid detected by the level detector 230 reaches a level higher than a predetermined liquid level relative to the receptacle height, the controller 210 outputs a control signal to preferably end the liquid ejection from the liquid ejector 220.

The end of liquid ejection is preferably performed by comparison in between a liquid level value relative to a pre-stored level of the receptacle and the detected levels of the receptacle and the liquid.

Meanwhile, it is preferred that the automatic liquid dispensing method further includes a step of a receptacle detection for detecting whether there is present or absent a receptacle and a step of determining a level of liquid desired by a user.

Preferably, the measurement of receptacle height and level detection are performed by calculation of average values obtained by repeating the detection of the height of the receptacle and the level detection at least twice.

More preferably, the receptacle height is detected by signals of at least more than two ultrasonic receivers, each disposed at a different height, and the level height is detected by a signal of an ultrasonic receiver nearest to the liquid ejector from among the ultrasonic receivers.

Therefore, there is an advantage in the present disclosure in that ultrasonic is emitted onto an upper surface of a receptacle, the ultrasonic reflected from the upper surface of the receptacle is received to detect a receptacle height, such that the receptacle height may be freely detected regardless of shape, material, surface state and position of the receptacle.

Another advantage is that the automatic liquid dispenser using ultrasonic may be manufactured with less cost than that using light.

Meanwhile, it is preferred that the automatic liquid dispenser further include a receptacle sensor for sensing the receptacle, and an input unit for inputting a level of liquid to be ejected.

The controller is preferred to compare the level value of liquid relative to the pre-stored receptacle height with the level value of liquid relative to the receptacle height detected by the receptacle height measurer and level detector, thereby control the operation of the liquid ejector.

Furthermore, it is preferred that the automatic liquid dispenser further include a receptacle accommodator in which a receptacle is accommodated. At this time, the receptacle accommodator is preferred to be disposed with a marker for marking a receptacle accommodation point.

Furthermore, it is preferred that the receptacle height measurer and the level detector include an ultrasonic device and at least two or more ultrasonic reception sensors, and the marker is formed perpendicularly below the ultrasonic device.

The receptacle height measurer and the level detector may include at least one or more ultrasonic devices and at least two or more ultrasonic reception sensors, and the marker may be formed perpendicularly below any one of the ultrasonic reception sensors. The marker may be possibly formed perpendicularly below the liquid ejector.

Furthermore, it is preferred that the receptacle height measurer and the level detector include at least one or more ultrasonic devices and at least two or more ultrasonic reception sensors, and the marker have a radius of 80-150% of a radius of a circle including any one of the ultrasonic device, the liquid ejector and the ultrasonic reception sensors.

Furthermore, preferably, a measurement band of the receptacle height measurer or/and the level measurer is in the range of 2 cm to 1 meter, and most preferably, a measurement band of the receptacle height measurer or/and the level measurer is in the range of 2 cm to 60 cm.

Figure 3A:
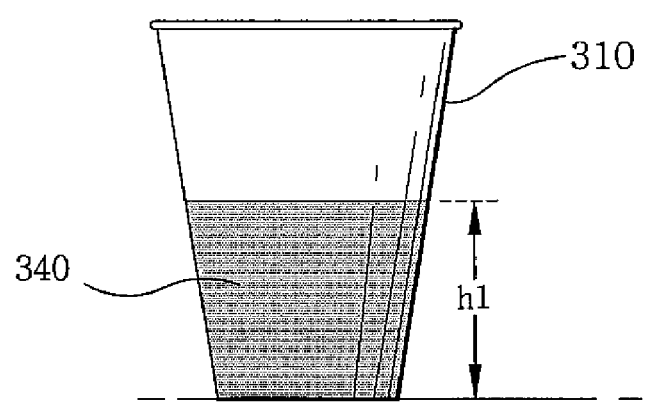
FIGS. 3a to 3c are schematic representations illustrating a receptacle contact unit of an automatic liquid dispenser according to the first exemplary implementation.
Figure 3B:
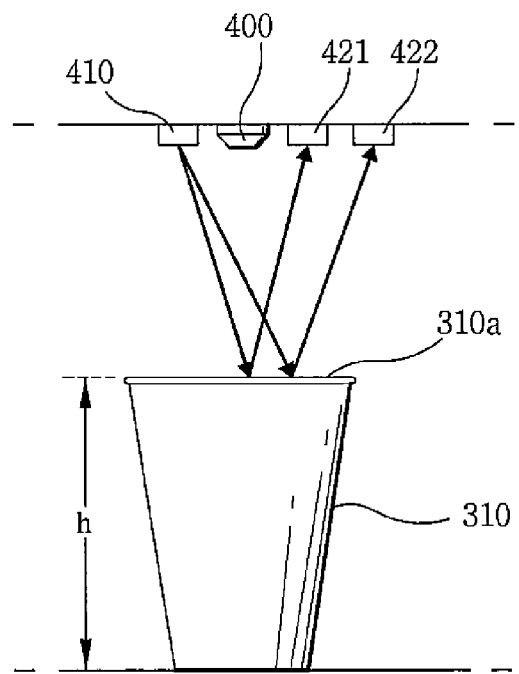
Figure 3C:
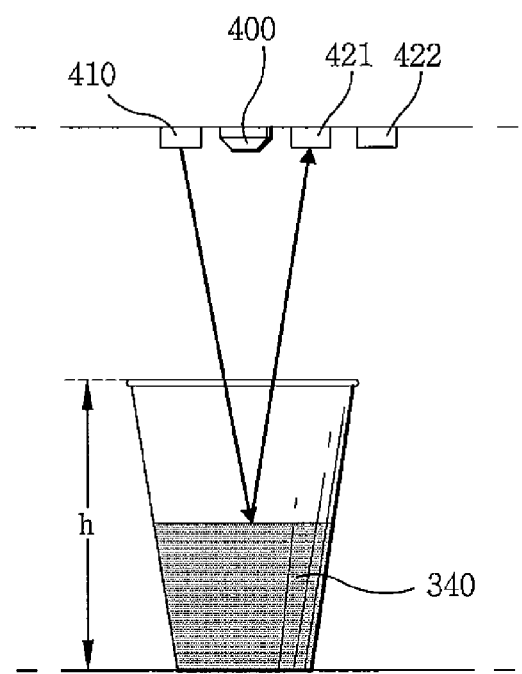

FIGS. 3a to 3c are schematic conceptual representations illustrating an automatic liquid dispensing method for driving an automatic liquid dispenser according to the first exemplary implementation, where the level of liquid 340 to be ejected into a receptacle 310 is first established (FIG. 3a). The established level is the level of the liquid 340 regardless of the size of the receptacle 310. Furthermore, the level may be established by pressing of a manipulation key by a user.

Figure 4A:
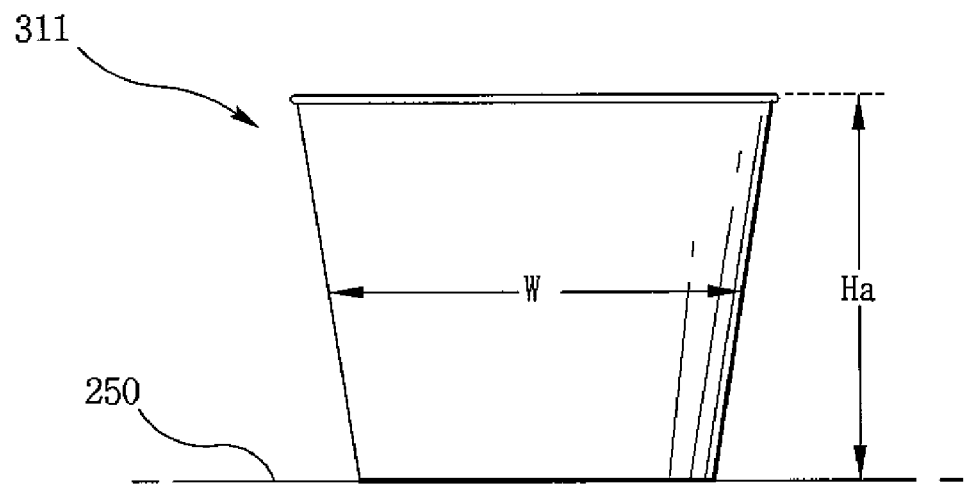
FIGS. 4a and 4b are conceptual drawings illustrating a concept of a receptacle height being measured in an automatic liquid dispenser mounted with a button-type receptacle contact unit according to the first exemplary implementation.
Figure 4B:
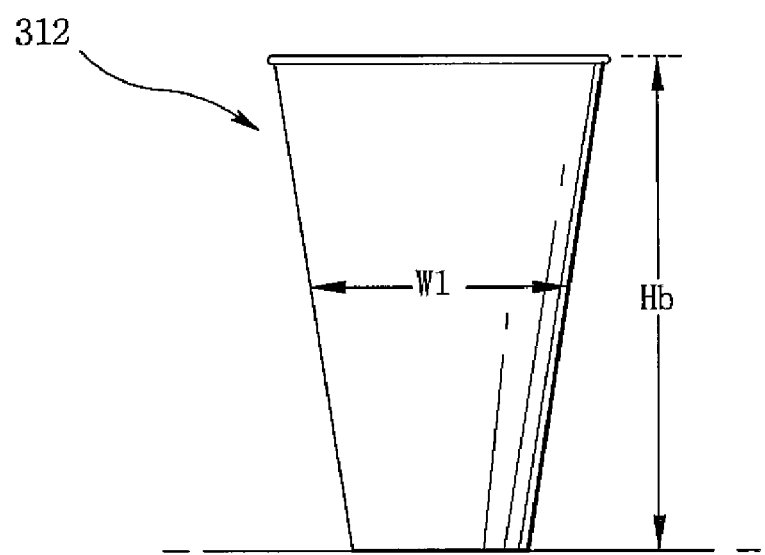

In other words, as shown in FIGS. 4a and 4b, even if widths and heights of first and second receptacles 311, 312 are different to each other, a predetermined height lower than each height (Ha, Hb) of the first and second receptacles 311, 312 is taken as a level of liquid to be ejected. For example, if the liquid is filled up to 80% of the receptacle height, the 80% of the receptacle height is considered an established level of the liquid to be ejected.

As noted above, the first and the second receptacles 311, 312 are different to each other, where the width of the first receptacle 311 is 'W', the height is 'Ha', while the width of the second receptacle 312 is 'W1', and the height is 'Hb'.

Now, if the receptacle 310 is positioned underneath the liquid ejector, ultrasonic is emitted to an upper surface of the receptacle, and the ultrasonic reflected from the upper surface of the receptacle is received, and the receptacle height is measured by a receptacle height measurer using a signal generated from the reflected ultrasonic (FIG. 3b).

The receptacle height measurer includes at least one or more ultrasonic devices 410 and at least two or more ultrasonic reception sensors 421, 422.

In other words, the ultrasonic device 410 emits ultrasonic, and the emitted ultrasonic is reflected from the upper surface of the receptacle 310 and received by the ultrasonic reception sensors 421, 422 to enable to detect the height (h) of the receptacle 310.

Preferably, a gain value of the ultrasonic reception sensors 421, 422 be lower than gain values of the other ultrasonic reception sensors, such that ultrasonic reflected from the margin of the receptacle, i.e., the upper surface of the receptacle, is made to be undetectable.

Furthermore, preferably, the receptacle height measurer and the level detector respectively include one ultrasonic device and three ultrasonic reception sensors.

Once the height of the receptacle 310 is measured, the liquid ejector 400 ejects liquid into the receptacle 310 up to a level higher than the established level (FIG. 3c). The level detector detects the level of the liquid ejected into the receptacle 310 in real time. At this time, the level detector is preferred to include one of the ultrasonic reception sensors 421, 422. To be more specific, only one ultrasonic reception sensor out of two ultrasonic reception sensors 421, 422 detects the level of the liquid inside the receptacle 310.

In other words, the ultrasonic emitted from the ultrasonic device 410 is reflected from the upper surface of the liquid inside the receptacle and is received by one of the ultrasonic reception sensor 421, whereby the liquid level can be detected. If the level detected by the ultrasonic reception sensor reaches a level higher than the predetermined liquid level, the ejection by the liquid ejector 400 is stopped.

Meanwhile, it is preferable that the liquid level be detected using ultrasonic received by the ultrasonic reception sensor 421 whose gain value is lowest among the two ultrasonic reception sensors 421, 422.

Figure 5:
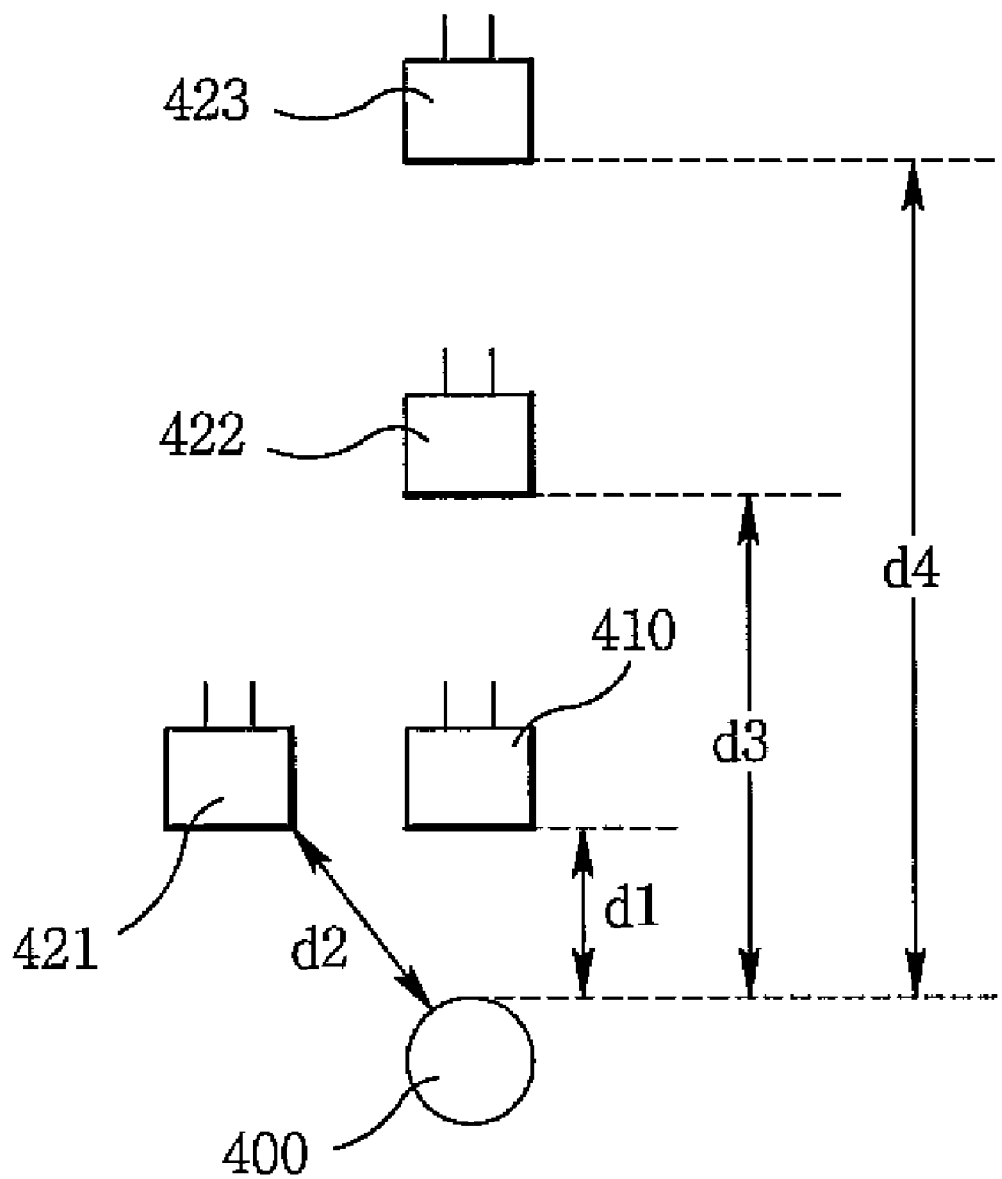
FIG. 5 is a conceptual drawing illustrating a concept of a receptacle height being measured in an automatic liquid dispenser where a receptacle contact unit is disposed using a pressure sensor according to the first exemplary implementation.

FIG. 5 is a conceptual drawing illustrating how the ultrasonic device 410 and one ultrasonic reception sensor 421 are arranged according to the first exemplary implementation, where the ultrasonic device 410 and a plurality of ultrasonic reception sensors 421, 422, 423 are disposed about the liquid ejector 400.

At this time, as depicted in FIG. 5, distances (d1, d2) from the ultrasonic device 410 and ultrasonic reception sensor 421 to the liquid ejector 400 are preferably shorter than distances (d3, d4) from remaining ultrasonic reception sensors 422, 423 to the liquid ejector 400 (d1<d3, d1<d4, d2<d3, d2<d4).

It is preferred that level be detected from the ultrasonic reception sensor 421 adjacent to the liquid ejector 400. Furthermore, the ultrasonic reception sensor 421 nearest to the liquid ejector 400 participates in the measurement of the receptacle height, and the gain value is designed to be relatively lower than gain values of other ultrasonic reception sensors 422, 423, such that an ultrasonic signal received by being reflected from the upper surface of the liquid can be minimally detected or not detected at all.

Preferably, a beam angle of the ultrasonic device 410 is in the range of 60-150 degrees. At this time, interference occurs at beam angles of over 150 degrees of the ultrasonic reception sensors 421, 422, 423. Preferably, any one of the ultrasonic device and ultrasonic reception sensors is attached with noise absorbing material.

In other words, if a plurality of ultrasonic reception sensors are used, ultrasonic received from respective ultrasonic reception sensors generates interference to make it difficult to precisely analyze the height or level of the liquid, such that the noise absorbing material is used to wrap an entire or part of an exterior walls of the ultrasonic emission and reception sensors to thereby minimize the interference of the ultrasonic.

Furthermore, the ultrasonic device is preferably formed nearest to the liquid ejector. Each ultrasonic reception sensor is preferably formed at a different position from the liquid ejector. It is preferred that the liquid level be detected by a signal from the ultrasonic reception sensor which is closest to the liquid ejector.

FIG. 6 is a flowchart illustrating a method for driving an automatic liquid dispenser according to the first implementation, where the level of the liquid to be ejected into the receptacle is established (S10).

The level of liquid inside the receptacle is a saturated quantity of liquid that is ejected into the receptacle accommodated in the automatic liquid dispenser.

For example, if liquid is inputted into a receptacle having a height of (a), the level of liquid to be ejected into the receptacle is established in the range of 50-80% when the height (a) of the receptacle is 100%. Then, a receptacle is inserted underneath the automatic liquid dispenser (S20). Ultrasonic is generated from the ultrasonic device (S30).

Successively, the ultrasonic generated from the ultrasonic device is reflected from the upper surface of the receptacle, and the ultrasonic reflected from the upper surface of the receptacle is received by the plurality of ultrasonic reception sensors to detect the receptacle height (S40). The liquid is ejected into the receptacle from the automatic liquid dispenser (S50).

The level of the liquid ejected into the receptacle is detected (S60), where the detection of the level of the liquid inside the receptacle is preferably performed by one of the plurality of ultrasonic reception sensors, and the detection is continuously performed in real time from the start of the liquid being ejected from the automatic liquid dispenser to the end of the liquid ejection.

Determination is made as to whether the detected liquid level is higher than the established liquid level (S70). If the detected liquid level is higher than the established liquid level, the liquid ejection is ended at the automatic liquid dispenser.

Figure 7A:
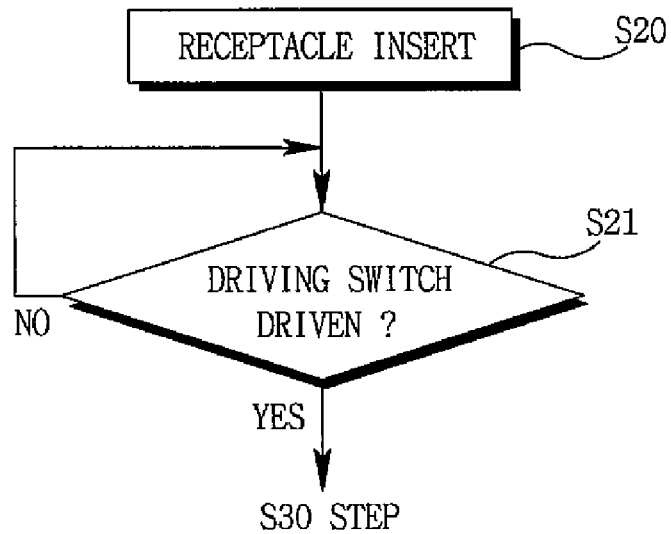
FIGS. 7a and 7b are flowcharts illustrating the performance of an automatic liquid dispensing method according to the first implementation.
Figure 7B:
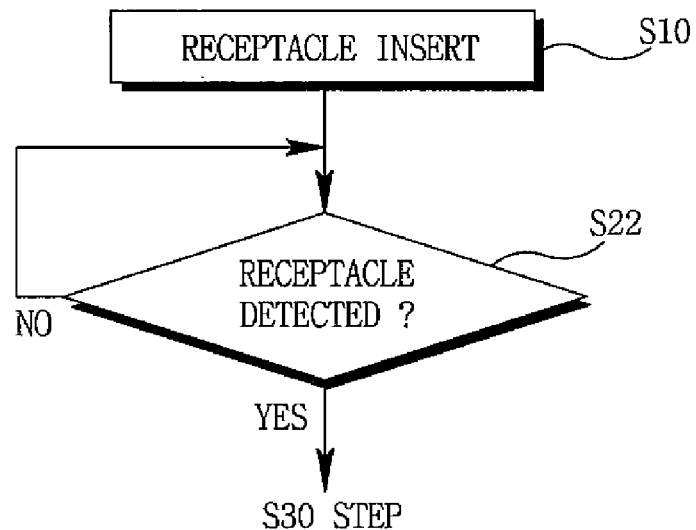

FIGS. 7a and 7b are flowcharts illustrating the performance of an automatic liquid dispensing method according to the first implementation, where flow just like in FIG. 7a or FIG. 7b is performed before the automatic liquid dispensing (before the performance of S30) after the receptacle is accommodated into the automatic liquid dispenser in the automatic liquid dispensing method of FIG. 6.

In other words, as depicted in FIG. 7a, following the accommodation (S20) of the receptacle into the automatic liquid dispenser, determination is made as to whether a driving switch has been activated (S21). The driving switch is disposed at the automatic liquid dispenser, so that the automatic liquid dispensing can be performed by pressing the switch, after the user accommodates the receptacle into the dispenser.

If the driving switch has been activated, the step (S30) of generating ultrasonic from the ultrasonic device is performed.

Now, referring to FIG. 7b, following the receptacle having been accommodated into the automatic liquid dispenser (S20), the automatic liquid dispenser determines whether the receptacle has been detected (S22). Preferably, the receptacle detection is performed by using a detection sensor. If the receptacle has been detected, ultrasonic is generated by the ultrasonic device (S30).

Figure 8:
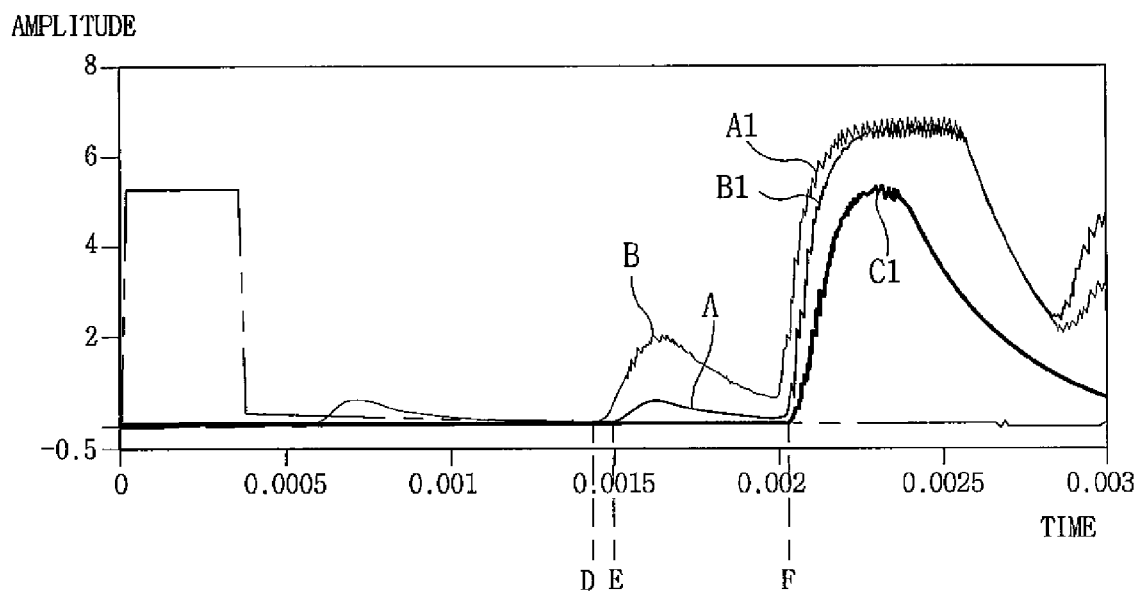
FIG. 8 is a graph in which ultrasonic signals received by the ultrasonic reception sensors are measured according to the first implementation.

FIG. 8 is a graph in which ultrasonic signals received by the ultrasonic reception sensors are measured according to the first implementation, where ultrasonic is emitted from one ultrasonic device, and the ultrasonic emitted by the ultrasonic device is reflected from an upper surface of the receptacle (an upper margin of the receptacle) and a surface of the liquid to be received by three ultrasonic reception sensors. FIG. 8 shows the graph in which ultrasonic signals received by the ultrasonic reception sensors are measured.

As noted above, a gain value of an ultrasonic reception sensor out of other ultrasonic reception sensors is set up to be lower than each gain value of other ultrasonic reception sensors, such that the ultrasonic that is reflected from the upper surface of the receptacle is not detected.

As a result, the ultrasonic received by the ultrasonic reception sensor whose gain value is established to be low, out of ultrasonic waves reflected from the upper surface of the receptacle, has almost no amplitude and a peak thereof is not shown on the graph.

The ultrasonic waves reflected from the upper surface of the receptacle emitted from the other two ultrasonic reception sensors are shown as peaks of 'A' and 'C' on the graph.

Referring again to FIG. 8, peaks of 'A1', 'B1' and 'C1' received by the ultrasonic reception sensors are seen, where the peaks are the ones of ultrasonic received by the ultrasonic reception sensors by being reflected from the liquid inputted into the receptacle. Furthermore, the receptacle height and the liquid level can be known from the graph.

In other words, as distance equals to speed×time, and the speed of the ultrasonic is a known fact, the only thing is to measure the time. Therefore, if the time to 'D' and 'E' depicted by ultrasonic peaks of 'A' and 'B' relative to the height of the receptacle is measured, the receptacle height can be calculated. Furthermore, if the time to 'F' shown by the ultrasonic peak of 'C1' relative to the liquid level is measured, the level of the liquid inserted into the receptacle can be obtained.

Figure 9:
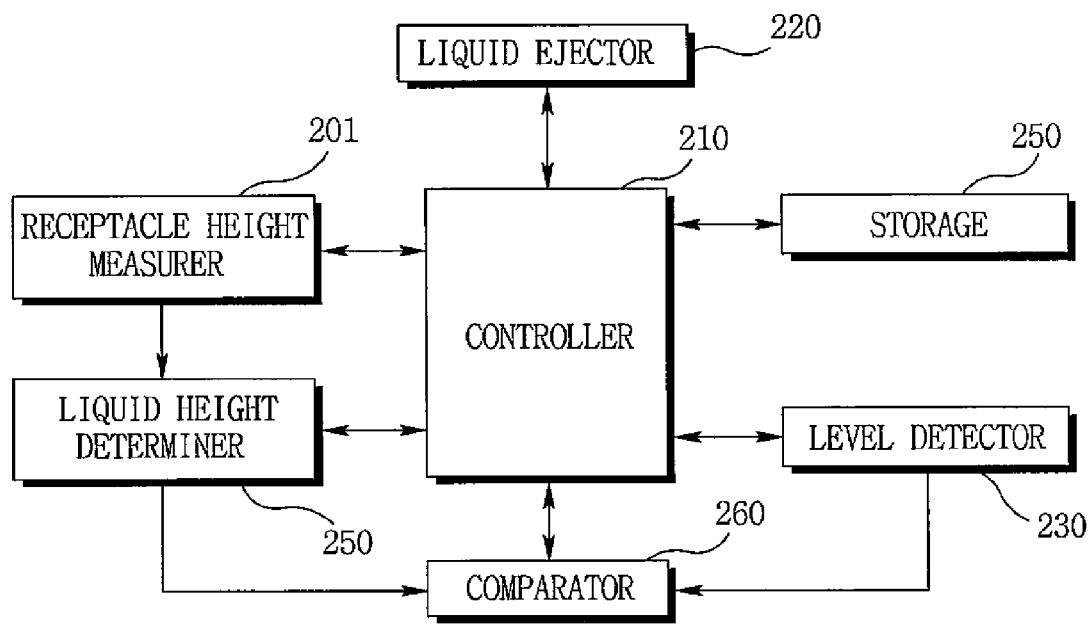
FIG. 9 is a schematic block diagram illustrating an automatic liquid dispenser according to a second exemplary implementation.

FIG. 9 is a schematic block diagram illustrating an automatic liquid dispenser according to a second exemplary implementation.

Referring to FIG. 9, the automatic liquid dispenser includes a receptacle height measurer 201 emitting ultrasonic to an upper surface of the receptacle and receiving the ultrasonic reflected from the upper surface of the receptacle to measure a receptacle height several times, a receptacle height determiner 240 calculating an average value of the receptacle height measured several times by the receptacle height measurer to determine the receptacle height, a liquid ejector 220 ejecting the liquid into the receptacle, a storage 250 stored with a liquid level relative to the receptacle height as a predetermined data, a level detector 230 detecting the level of the liquid inside the receptacle, and a comparator 260 receiving the receptacle height determined by the receptacle height determiner 240 and the liquid level detected by the level detector 230 and comparing the liquid level relative to the predetermined receptacle height stored in the storage 250.

The receptacle height measurer 201, the receptacle height determiner 240, the liquid ejector 220, the storage 250, the level detector 230 and the comparator 260 are all controlled by a controller 210.

The receptacle height measurer 201 includes an ultrasonic device and a plurality of ultrasonic reception sensors, where the ultrasonic device emits ultrasonic to an upper surface of the receptacle, and one of the plurality of ultrasonic reception sensors first receives the ultrasonic reflected from the upper surface of the receptacle, and where it is preferable that the receptacle height be measured several times.

The level detector 230 is preferably an ultrasonic reception sensor nearest to the liquid ejector 220 and the ultrasonic device, out of the plurality of ultrasonic reception sensors of the receptacle height measurer 201.

If the level detector 230 is an ultrasonic reception sensor nearest to the liquid ejector 220 and the ultrasonic device, the ultrasonic reception sensor measures the level of the liquid inside the receptacle several times.

Preferably, the automatic liquid dispenser further includes a level determiner (not shown) determining the liquid level by calculating an average value of the liquid level measured several times by the ultrasonic reception sensors. At this time, the comparator 260 receives the liquid level determined by the level determiner.

When a user accommodates a receptacle into the automatic liquid dispenser thus described, the controller 210 outputs to the receptacle height measurer 201 a control signal requesting an emission of the ultrasonic to the upper surface of the receptacle.

Successively, the ultrasonic device at the receptacle height measurer 201 emits the ultrasonic to the upper surface of the receptacle, and the ultrasonic reflected from the upper surface of the receptacle is received by the plurality of ultrasonic reception sensors. At this time, an ultrasonic reception sensor which first receives the reflected ultrasonic measures the receptacle height several times, out of the plurality of ultrasonic reception sensors. The terms of measuring the receptacle height several times means to continuously measure in real time the height from the start of the liquid being ejected into the receptacle to the end of the liquid ejection.

Thereafter, the receptacle height determiner 240 calculates an average value of the receptacle height measured several times by the receptacle height measurer 201 and decides the receptacle height.

If the receptacle height is decided by the receptacle height determiner 240, the controller 210 transmits a control signal to the liquid ejector 220, where the liquid ejector 220 starts to eject the liquid to the receptacle.

Successively, if the liquid ejector 220 starts to eject the liquid to the receptacle, the level detector 230 detects the level of the liquid inside the receptacle.

Meanwhile, the storage 250 is stored with a liquid level desired by the user relative to the receptacle height as a predetermined data. For example, 80% of the receptacle height is set up as the liquid level, and the established data is stored in the storage.

The comparator 260 receives the receptacle height and the liquid level determined by the receptacle height determiner 240, and compares the liquid level relative to the predetermined receptacle height stored in advance in the storage with the receptacle height and the liquid level determined by the receptacle height determiner 240.

If the level inside the receptacle is equal to or greater than the liquid level relative to the predetermined receptacle height, the controller 210 sends a control signal to the liquid ejector 220 to terminate the liquid ejection.

Therefore, there is an advantage in the automatic liquid dispenser thus described in that the ultrasonic can be emitted to an upper surface of a receptacle, and the ultrasonic reflected from the upper surface of the receptacle can be received to detect a height of the receptacle, whereby the receptacle height can be freely detected regardless of shape, material and surface state of the receptacle, and regardless of a position where the receptacle is placed.

Another advantage is that the automatic liquid dispenser can use the ultrasonic to reduce a manufacturing cost compared with that of using light.

FIGS. 10a to 10d show schematic conceptual drawings illustrating a method for driving an automatic liquid dispenser according to a second exemplary implementation.

Figure 10A:
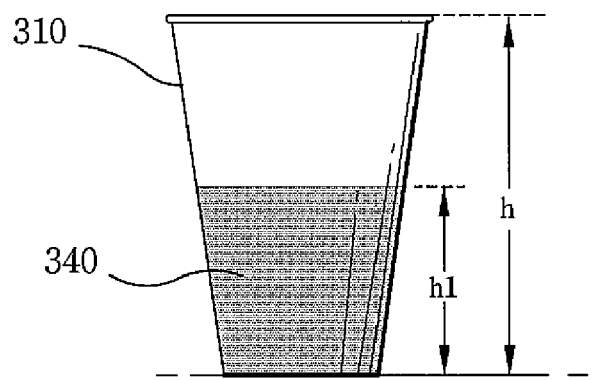
FIGS. 10a to 10d are schematic conceptual drawings illustrating a method for driving an automatic liquid dispenser according to a second exemplary implementation.

First, a level (h1) of liquid 340 to be ejected into a receptacle 310 is set up relative to a height (h) of the receptacle 310 (FIG. 10a). The established level (h1) of the liquid is in proportion to the size of the receptacle 310, i.e., 70% of the receptacle. Furthermore, the liquid level may be set up by depression of a manipulation key by a user.

Figure 10B:
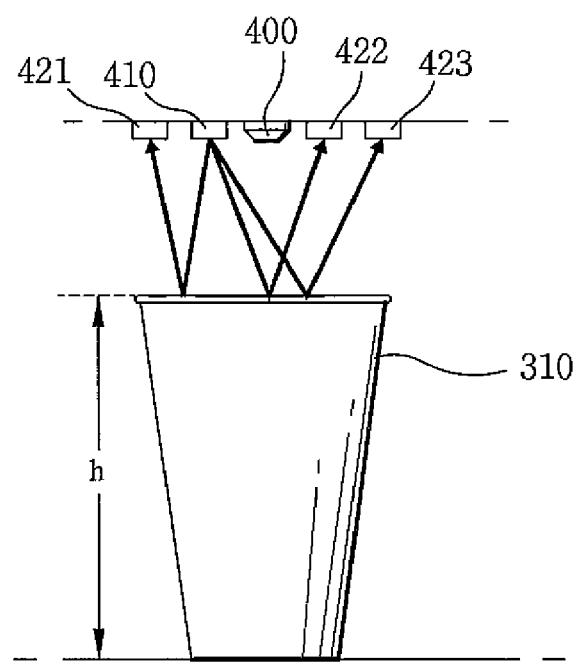

When the receptacle 310 is accommodated underneath a liquid ejector 400 around which an ultrasonic device 410 and a plurality of ultrasonic reception sensors are disposed, the ultrasonic device 410 emits the ultrasonic on to an upper surface of the receptacle 310 (FIG. 10b).

Figure 10C:
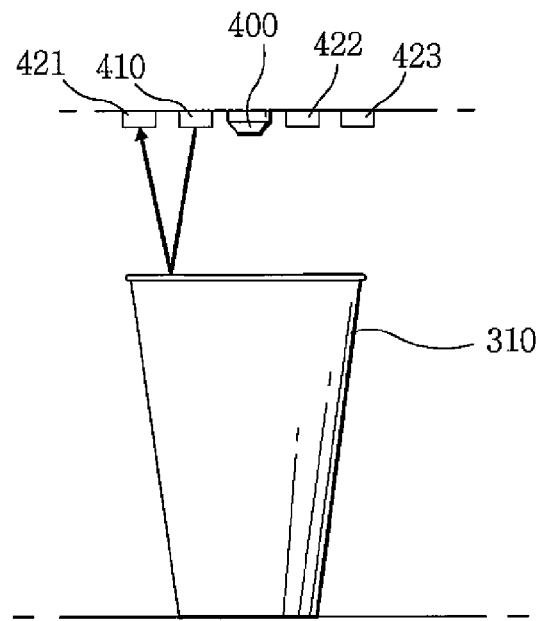

Thereafter, an ultrasonic reception sensor 421 which first receives the ultrasonic reflected from the upper surface of the receptacle 310 measures the receptacle height several times, out of the plurality of ultrasonic reception sensors 421, 422, 423, and an average value of the receptacle height measured several times is calculated to decide the receptacle height (FIG. 10c). The ultrasonic reception sensor that first receives the ultrasonic reflected from the upper surface of the receptacle 310 may vary according to position, width and height of the receptacle 310.

Figure 10D:
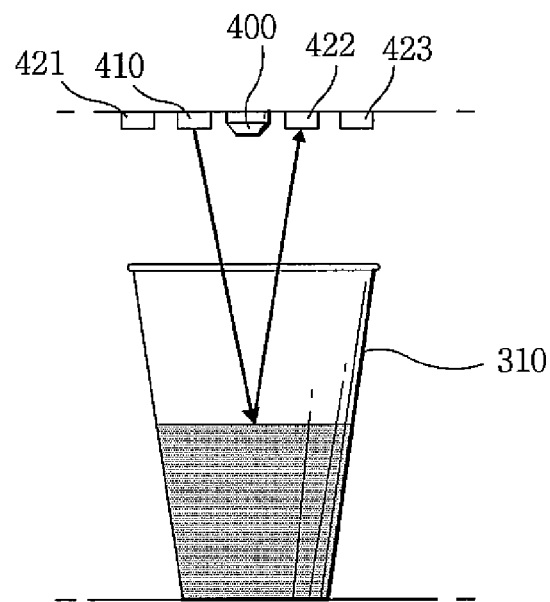

Lastly, once the receptacle height is determined, the liquid is ejected by the liquid ejector 400 to the receptacle 310 up to the predetermined level (FIG. 10d).

When the liquid level is determined by the ultrasonic reception sensor nearest to the liquid ejector 400 and the liquid reaches the predetermined level, the liquid ejector 400 ends the ejection of the liquid, and the level of the liquid inside the receptacle 310 is detected in real time by the level detector.

Figure 11:
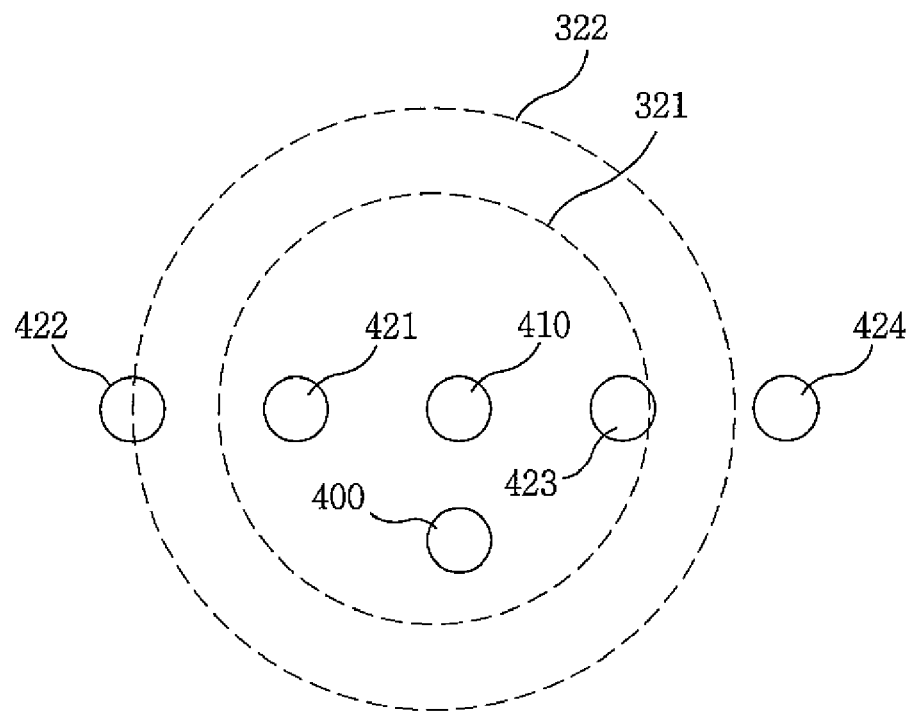
FIG. 11 is a schematic drawing illustrating a state where a liquid ejector and ultrasonic sensors are disposed according to the second exemplary implementation.

FIG. 11 is a schematic drawing illustrating a state where a liquid ejector and ultrasonic sensors are disposed according to the second exemplary implementation, where an ultrasonic device 410 and the plurality of ultrasonic reception sensors 421, 422, 423, 424 are disposed about the liquid ejector 400.

The ultrasonic device 410 and the plurality of ultrasonic reception sensors 421, 422, 423, 424 are freely arranged about the liquid ejector 400, the arrangement of which is not limited to that of FIG. 4.

If receptacles 321, 322 of different widths are disposed underneath the liquid ejector 400, and if the ultrasonic emitted from the ultrasonic device 410 first reaches the ultrasonic reception sensor 423, the receptacle height is measured only by the ultrasonic reception sensor 423 in case of the receptacle 321 with a narrow width.

Furthermore, in case of the receptacle 322 with a wide width, if the ultrasonic generated from the ultrasonic device 410 first and foremost reaches the ultrasonic reception sensor 422, the receptacle height is measured only by the ultrasonic reception sensor 422.

At this time, a beam angle of the ultrasonic device 410 is preferred to be in the range of 30-150 degrees. If the beam angle is equal to or greater than 150 degrees, interference occurs where the emitted ultrasonic is directly carried over to the ultrasonic reception sensors 421, 422, 423, 424. It is therefore preferred that external walls of the ultrasonic reception and devices be coated with noise absorbing materials.

In other words, use of multiple ultrasonic reception sensors results in occurrence of interference in the ultrasonic waves to make it difficult to precisely analyze the receptacle height and the liquid level, such that an entire or part of the external walls of the ultrasonic emission and ultrasonic reception sensors are wrapped by noise absorbing materials to enable to minimize the interference of ultrasonic waves. Furthermore, preferably, a measurement band of the ultrasonic reception sensors is in the range of 2 cm to 1 meter.

Figure 12:
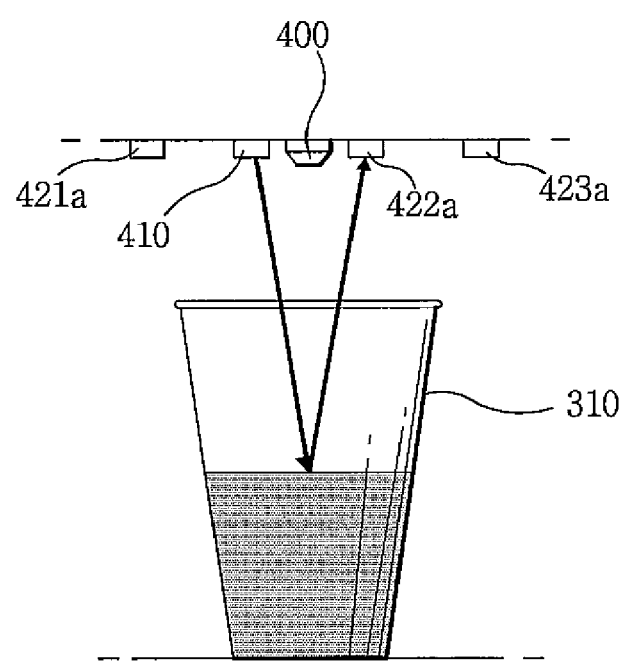
FIG. 12 is a schematic cross-sectional view illustrating an ultrasonic reception sensor for measuring a level of liquid in a receptacle according to the second exemplary implementation.

FIG. 12 is a schematic cross-sectional view illustrating a reception ultrasonic sensor for measuring a level of liquid in a receptacle according to the second exemplary implementation, where the liquid level is measured by an ultrasonic reception sensor which is most adjacent to the ultrasonic device 410 and the liquid ejector 400.

Referring to FIG. 12, in case that the ultrasonic device 410 and a plurality of ultrasonic reception sensors 421a, 422a, 423a are positioned about the liquid ejector 400, the ultrasonic reception sensor 422a measures the liquid level as it is nearest to the ultrasonic device 410 and the liquid ejector 400. A distance from the ultrasonic device 410 to the ultrasonic reception sensor 422a is shorter than a distance from the ultrasonic device 410 to the remaining ultrasonic reception sensors 423a, 421a, such that the ultrasonic reception sensor 422a is the nearest to the ultrasonic device 410.

Figure 13:
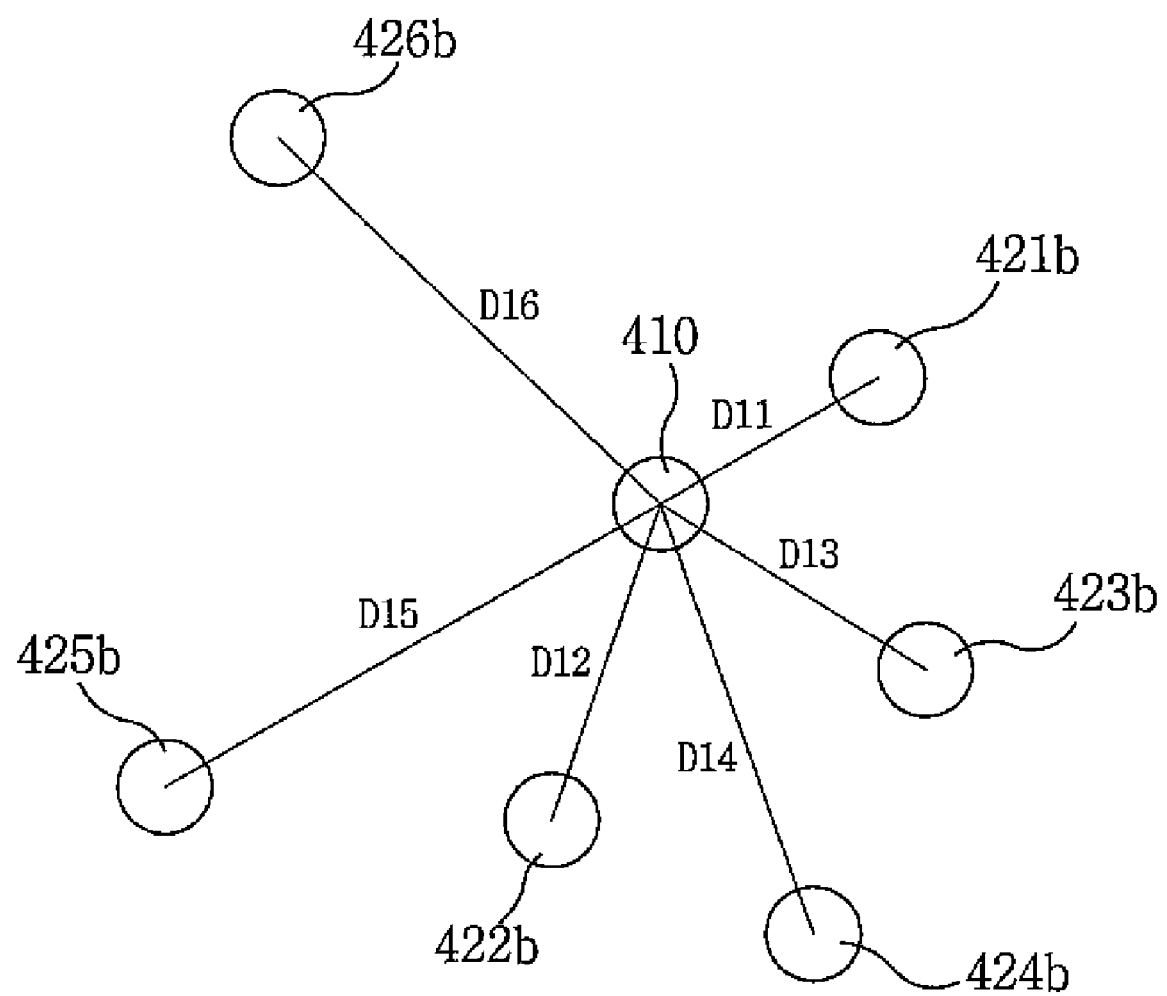
FIG. 13 is a schematic drawing illustrating an ultrasonic reception sensor for measuring a level of liquid inside a receptacle according to the second exemplary implementation.

FIG. 13 is a schematic drawing illustrating a reception ultrasonic sensor for measuring a level of liquid inside a receptacle according to the second exemplary implementation, where an ultrasonic device and a plurality of ultrasonic reception sensors may be designed to be freely disposed.

In case of an ultrasonic device 410 and six ultrasonic reception sensors 421b, 422b, 423b, 424b, 425b, 426b being positioned about the liquid ejector, where a distance from the ultrasonic device 410 to the ultrasonic reception sensors 421b, 422b, 423b, 424b, 425b, 426b is taken into consideration, the ultrasonic reception sensor 421b measures the liquid level because D11 is shorter than D12 to D16. At this time, the ultrasonic reception sensor measuring the liquid level must be closest to the liquid ejector.

Figure 14:
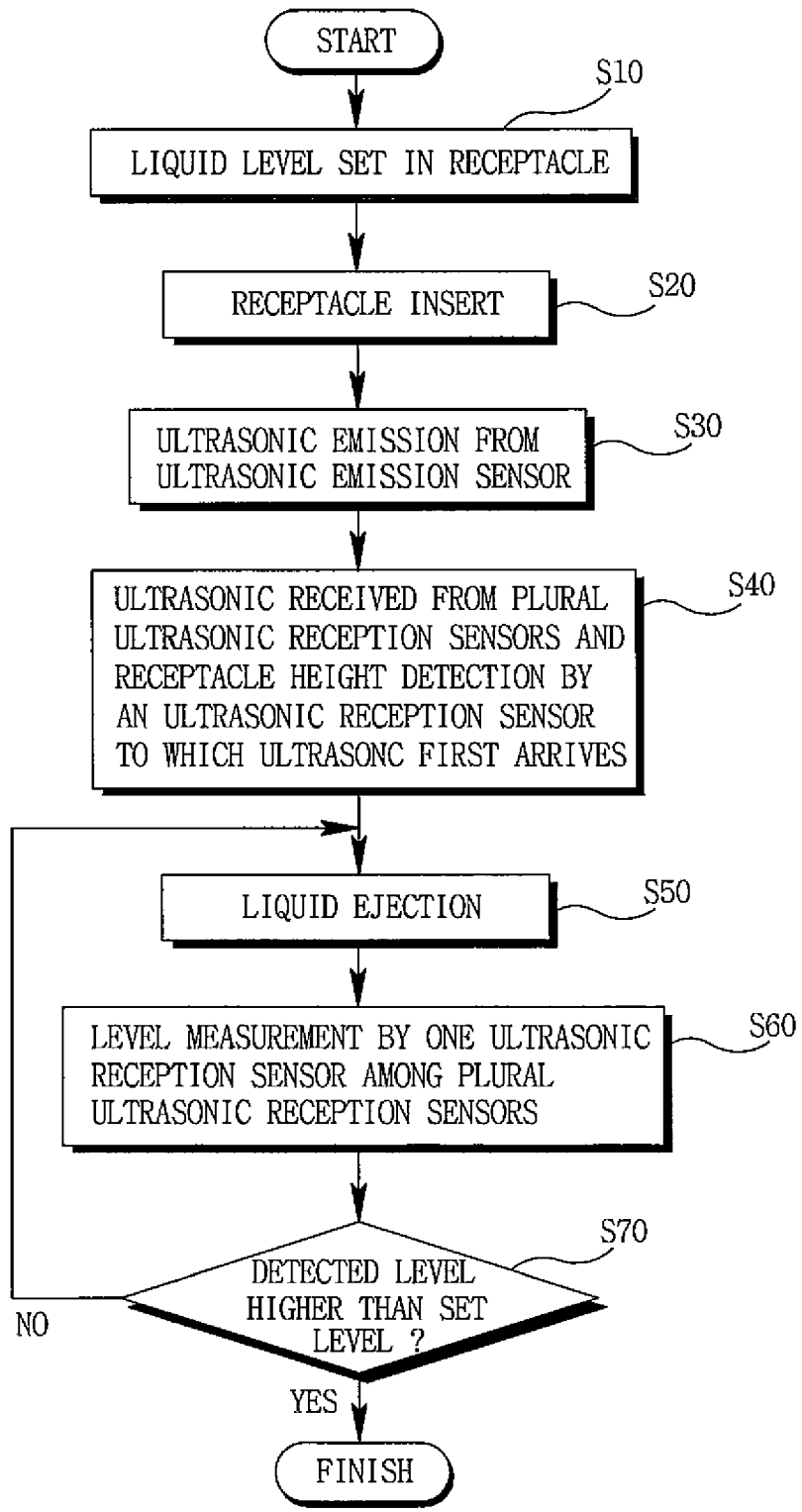
FIG. 14 is a flowchart illustrating another method for driving an automatic liquid dispenser according to the second exemplary implementation.

FIG. 14 is a flowchart illustrating another method for driving an automatic liquid dispenser according to the second exemplary implementation.

First, a level of the liquid to be ejected into the receptacle is set up (S10). At this time, the level of the liquid inside the receptacle is a saturation height (%) of liquid to be ejected into the receptacle relative to the height of the receptacle inserted into the automatic liquid dispenser. For example, if liquid is ejected into a receptacle having a height of (a), the level of the liquid to be ejected into the receptacle is set at 30-80% when the height (a) of the receptacle is 100%.

The receptacle is accommodated underneath the liquid ejector (S20). Successively, the ultrasonic is emitted from an ultrasonic device (S30). The ultrasonic generated from the ultrasonic device is reflected from an upper surface of the receptacle, and the ultrasonic reflected from an upper surface of the receptacle is received by a plurality of ultrasonic reception sensors, and the height of the receptacle is measured by an ultrasonic reception sensor at which the ultrasonic arrives first and foremost (S40).

Thereafter, liquid is ejected into the receptacle by the liquid ejector (S50). The level of the liquid to be ejected into the receptacle is measured by one of the plurality of ultrasonic reception sensors (S60). At this time, the level of the liquid is preferably measured by an ultrasonic reception sensor among the plurality of ultrasonic reception sensors which is most adjacent to the ultrasonic device and the liquid ejector. Furthermore, the detection of the level of the liquid inside the receptacle is continuously performed in real time from the start of the liquid being ejected from the automatic liquid dispenser to the end of the liquid ejection.

Then, determination is made as to whether the detected liquid level is higher than the established liquid level (S70). If the detected liquid level reaches the established liquid level, the liquid ejection is ended by the liquid ejector.

Figure 15:
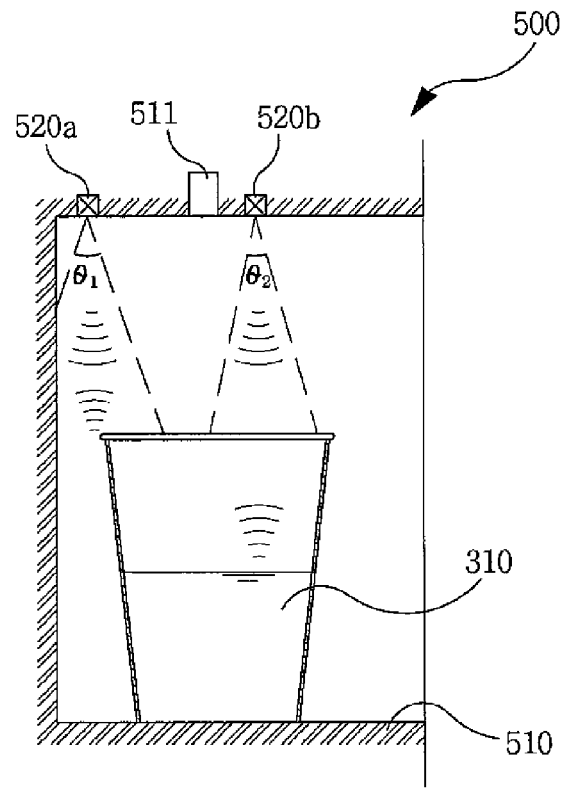
FIG. 15 is a schematic cross-sectional view illustrating a construction of an automatic liquid dispenser according to a third exemplary implementation.

FIG. 15 is a schematic cross-sectional view illustrating a construction of an automatic liquid dispenser according to a third exemplary implementation, where an automatic liquid dispenser 500 includes a liquid ejector 511, a first ultrasonic sensor 520a, a second ultrasonic sensor 520b and a controller (not shown).

First of all, the liquid ejector 511 is positioned above a receptacle accommodator 510 provided for accommodating the receptacle.

The first ultrasonic sensor 520a is a sensor for sensing the height of the receptacle to be accommodated into the receptacle accommodator 510, and the second ultrasonic sensor 520b is a sensor for sensing the height of liquid to be ejected into the receptacle.

To be more specific, as depicted in FIG. 15, the first ultrasonic sensor 520a and the second ultrasonic sensor 520b are respectively accommodated above the receptacle accommodator 510, and at the same height as that of the liquid ejector 511, where the first and second ultrasonic sensors 520a, 520b are preferred to be opposite against each other about the liquid ejector 511. The second ultrasonic sensor 520b is further preferred to be positioned closer to the liquid ejector 511 than the first ultrasonic sensor 520a.

In other words, although the first and second ultrasonic sensors 520a, 520b are disposed around the liquid ejector 511, the second ultrasonic sensor 520b is positioned closer to the liquid ejector 511 than the first ultrasonic sensor 520a, because ultrasonic signals are interfered or offset to reduce a detecting or discriminating power if a distance between the first and second ultrasonic sensors 520a, 520b is too close.

More preferably, the first and second ultrasonic sensors 520a, 520b have mutually different frequency bands in order not to be interfered in respective ultrasonic signals.

Meanwhile, ordinary receptacles may have a small upper area at the mouth to allow emitting less ultrasonic from upper surfaces thereof, and therefore resolution and discriminating power may decrease, such that it is preferable that the first ultrasonic sensor 520a have a frequency range of 30 kHz to 80 kHz. When an ultrasonic sensor having the said frequency range is employed, sensitivity of the ultrasonic reflected from the upper surface of the receptacle is found to be excellent to enable to precisely measure the receptacle height.

Meanwhile, as shown in the drawing, a detection angle ($\theta_1$) of the first ultrasonic sensor 520a and a detection angle ($\theta_2$) of the second ultrasonic sensor 520b are preferred to be different from each other in order to prevent occurrence of interference or overlap of the ultrasonic, and the detection angle ($\theta_1$) of the first ultrasonic sensor 520a is preferred to be relatively greater than the detection angle ($\theta_2$) of the second ultrasonic sensor 520b.

The reason of the detection angle ($\theta_1$) of the first ultrasonic sensor 520a being relatively greater than the detection angle ($\theta_2$) of the second ultrasonic sensor 520b is to detect the ultrasonic signals reflected from the upper surface of the receptacle more precisely, even if the receptacle 310 is accommodated at a discretionary position of the receptacle accommodator 510 by a user.

Alternatively, the reason of the detection angle ($\theta_2$) of the second ultrasonic sensor 520b being relatively smaller than the detection angle ($\theta_1$) of the first ultrasonic sensor 520a is to detect only the ultrasonic signals reflected from the surface of the liquid more precisely.

The detection angle ($\theta_1$) of the first ultrasonic sensor 520a and the detection angle ($\theta_2$) of the second ultrasonic sensor 520b are preferred to be 60-120 degrees and 30-60 degrees respectively.

For reference, typical ultrasonic sensors may be categorized into two types, that is, an active type ultrasonic sensor capable of simultaneously transmitting and receiving the ultrasonic, and a passive type ultrasonic sensor capable of only receiving the ultrasonic. The first and second ultrasonic sensors 520a, 520b in the third exemplary implementation are all active type.

Lastly, the controller (not shown) is operated in such a fashion that the receptacle height is determined by a signal sensed by the first ultrasonic sensor, the level of liquid to be inputted into the receptacle is determined by the determined receptacle height, the level of liquid to be inputted into the receptacle is determined by a signal sensed by the second ultrasonic sensor, and the ejection of the liquid is terminated if the height of the ejected liquid is higher than a height of liquid that is inputtable.

Figure 16:
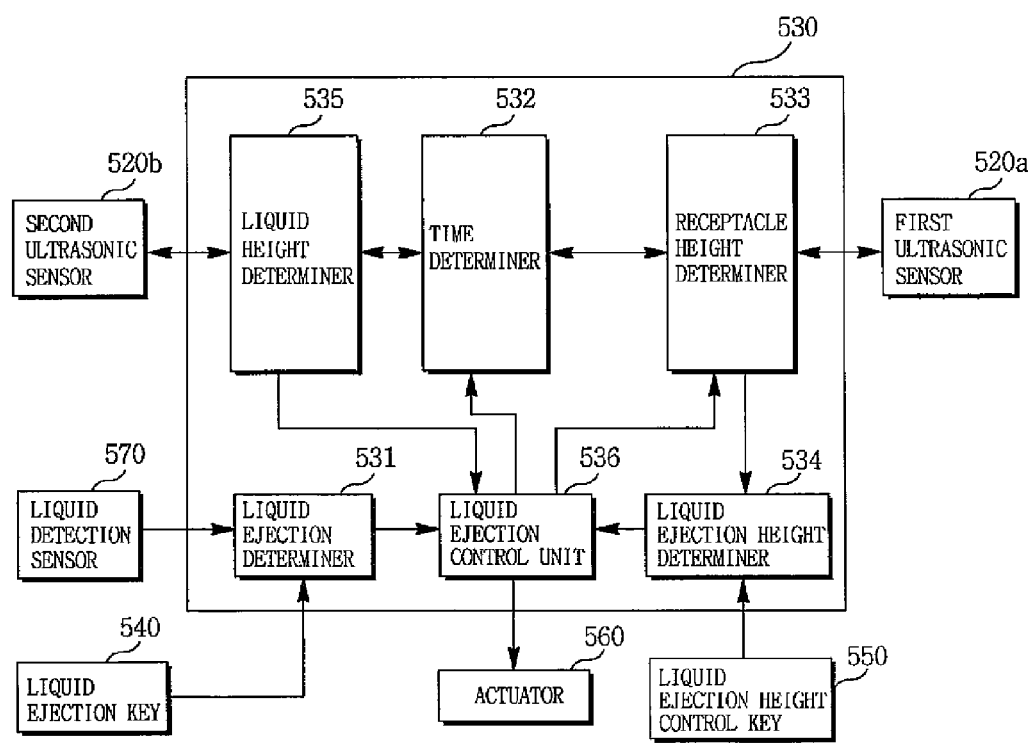
FIG. 16 is a block diagram illustrating a function of a controller in an automatic liquid dispenser according to the third exemplary implementation.

FIG. 16 is a block diagram illustrating a function of a controller 530 in an automatic liquid dispenser according to the third exemplary implementation, where the controller 530 includes a liquid ejection determiner 531, a time determiner 532, a receptacle height determiner 533, a liquid ejection height determiner 534, a liquid height determiner 535 and a liquid ejection control unit 536.

First, if a receptacle is accommodated into a receptacle accommodator in FIG. 15, a receptacle detection sensor 570 automatically detects the receptacle and generates a signal. If the signal thus generated from the receptacle detection sensor 570 is inputted into the liquid ejection determiner 531, a signal for ejecting the liquid is outputted to the liquid ejection control unit 536.

At this time, the liquid ejection determiner 531 generates a signal for ejecting the liquid, if a receptacle is available in the receptacle accommodator, and adversely, if a receptacle is not available in the receptacle accommodator, the liquid ejection determiner 531 does not generate a signal for ejecting the liquid.

Furthermore, if the user selects a liquid selection key 540, a selection signal from the liquid selection key 540 is inputted into the liquid ejection determiner 531 from which a signal for liquid ejection is outputted.

If the liquid ejection control unit 536 receives a signal for ejecting the liquid from the liquid ejection determiner 531, a control signal is sent to the receptacle height determiner 533 for sensing the receptacle height.

If the receptacle height determiner 533 receives the control signal from the liquid ejection control unit 536, the receptacle height determiner 533 drives the first ultrasonic sensor 520*a*.

At this time, the first ultrasonic sensor 520*a* transmits ultrasonic to an upper surface of the receptacle and detects the ultrasonic reflected from the upper surface of the receptacle. Furthermore, the receptacle height determiner 533 detects a lapse time from a point of the ultrasonic being transmitted by the time determiner 532 to a point of the ultrasonic being reflected from the upper surface of the receptacle, and detects the ultrasonic reflected from the upper surface of the receptacle to determine the receptacle height, and outputs a signal relative to the determined receptacle height to the liquid ejection height determiner 534.

At this time, the liquid ejection height determiner 534 determines the height of the liquid to be ejected into the receptacle in response to the receptacle height determined by the receptacle height determiner 533 and a ratio predetermined by the user by a liquid ejection height control key 550, and outputs to a signal relative to the ejectionable liquid height to the liquid ejection control unit 536.

The ejectionable liquid height to be determined by the liquid ejection height determiner 534 cannot be set up higher than the receptacle height, such that, for example, the liquid ejection height determiner 534 determines the ejectionable liquid height which is lower than the receptacle height determined by the ratio relative to the liquid height against the receptacle height predetermined by the user through the liquid ejection height control key 550.

Successively, when the liquid ejection control unit 536 receives a signal relative to the ejectionable liquid height, an actuator 560 is controlled and the liquid is ejected into the receptacle by the liquid ejector.

At the same time, the liquid ejection control unit 536 outputs a control signal to the liquid height determiner 535 in order to determine the height of the liquid to be ejected into the receptacle.

If the liquid height determiner 535 receives the control signal from the liquid ejection control unit 536, the liquid height determiner 535 drives the second ultrasonic sensor 520*b*. The second ultrasonic sensor 520*b* sends the ultrasonic to the upper surface of the liquid to be ejected, and detects the ultrasonic reflected from the upper surface of the liquid.

The liquid height determiner 535 detects a lapse time from a point of the ultrasonic being transmitted by the time determiner 532 to a point of the ultrasonic being reflected from the upper surface of the liquid, using the time determiner 532, and detects the ultrasonic reflected from the upper surface of the liquid to determine the height of the ejected liquid, and outputs a signal relative to the determined liquid height to the liquid ejection control unit 536.

The liquid ejection control unit 536 then compares the ejectionable liquid height determined by the liquid ejection height determiner 534 with the height of the actually ejected liquid determine by the liquid height determiner 535, and continuously performs the liquid ejection of the liquid ejector in order not to stop the driving of the actuator 560 if the height of the actually ejected liquid is not higher than the ejectionable liquid height.

If the height of the actually ejected liquid is higher than the ejectionable liquid height, the actuator 560 is made to stop to terminate the liquid ejection to the receptacle by the liquid ejector.

Therefore, it is preferable that the automatic liquid dispenser according to the third exemplary implementation include a liquid ejector for ejecting the liquid to the receptacle, a first ultrasonic sensor for sensing the height of the receptacle, a second ultrasonic sensor for sensing the height of the liquid to be ejected into the receptacle, and a controller for determining the receptacle height by a signal sensed by the first ultrasonic sensor, deciding the height of the liquid ejectionable to the receptacle in response to the determined receptacle height, determining the height of the liquid to be ejected to the receptacle in response to the signal sensed by the second ultrasonic sensor, and controlling the operation of the liquid ejector.

Figure 17A:
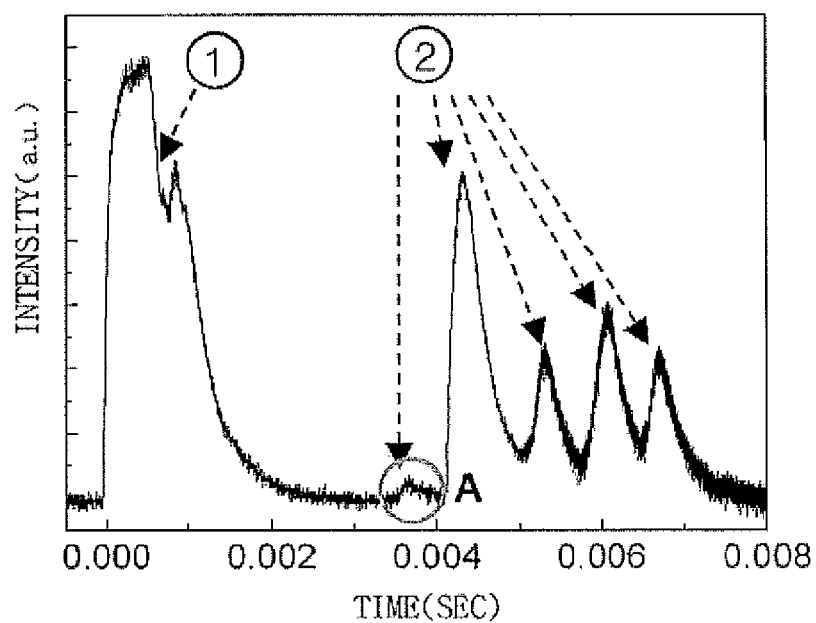
FIGS. 17a and 17b are graphs explaining ultrasonic reflected from an upper surface of a receptacle and the ultrasonic reflected from an upper surface of liquid inside the receptacle, the ultrasonic being detected from the first and second ultrasonic sensors according to the third exemplary implementation.
Figure 17B:
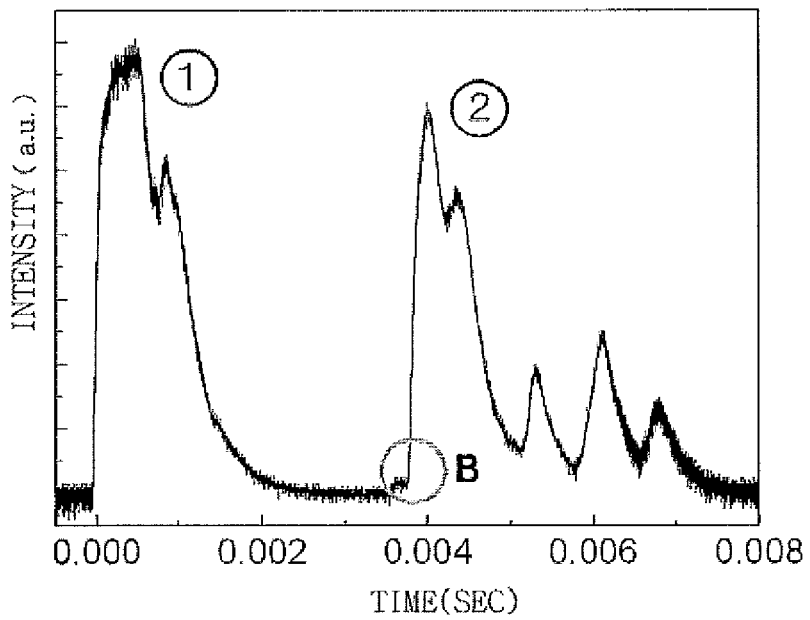

FIGS. 17*a* and 17*b* are graphs explaining ultrasonic reflected from an upper surface of a receptacle and ultrasonic reflected from an upper surface of liquid inside the receptacle, the ultrasonic being detected from the first and second ultrasonic sensors according to the third exemplary implementation.

The graph of FIG. 17*a* shows a detected ultrasonic returned by being emitted from the first ultrasonic sensor for measuring the receptacle height in the automatic liquid dispenser according to the exemplary implementation.

First, it should be noted from the graph of FIG. 17*a* that '①' defines transmission wave and '②' is reflection waves.

In other words, if ultrasonic is transmitted from the first ultrasonic sensor, the ultrasonic that is first transmitted has influence on the sensor to detect the transmission wave ① as shown in the drawing.

Therefore, the detected transmission wave ① therefore has nothing to do with the ultrasonic reflected from the upper surface of the receptacle, such that the detected transmission wave ① may be disregarded without the need of being referred to.

However, as shown in the graph of FIG. 17*a*, reflection waves are detected from an A part which is first detected after the transmission wave ①, where the A part is a part detected by the reflection waves from the upper surface of the receptacle.

It can be noted from the drawing that small waves are detected, because a distance between the first ultrasonic sensor and the upper surface of the receptacle is theoretically the shortest, and an area of the upper surface of the receptacle is small.

Therefore, a time that is consumed to detect the A part, i.e., a time taken for detecting a first returned reflection wave (A part) generated by the ultrasonic emitted by using the first ultrasonic sensor, is measured, which is then multiplied by 340 m/s, the speed of the sound, and divided by 2. This simple arithmetic can obtain a distance between the first ultrasonic sensor and the upper surface of the receptacle. The reason of dividing by 2 is that the consumed time is the time reciprocated by the ultrasonic on a path.

Lastly, a height value of the receptacle relative to the distance between the first ultrasonic sensor and the upper surface of the receptacle is determined. The height value may differ responsive to detection angles of the ultrasonic sensor, but if a cosine value relative to half of the detection angle of the first ultrasonic sensor is taken, and if the distance between the first ultrasonic sensor and the upper surface of the receptacle is taken as an oblique side of a right triangle, an approximate perpendicular distance between the first ultrasonic sensor and the upper surface of the receptacle. Furthermore, if the perpendicular distance between the first ultrasonic sensor and the upper surface of the receptacle is deducted from a predetermined perpendicular height of the receptacle accommodator, the height of the receptacle itself may be obtained.

The graph of FIG. 17b shows a detected ultrasonic returned by being emitted from the second ultrasonic sensor for measuring the receptacle height in the automatic liquid dispenser according to the exemplary implementation.

First, it should be noted from the graph of FIG. 17b that '①' also defines transmission wave and '②' also means reflection waves.

As in FIG. 17a, if ultrasonic is transmitted from the second ultrasonic sensor after the ejection of the liquid into the receptacle is started, the ultrasonic that is first transmitted has influence on the sensor to detect the transmission wave ① as shown in the drawing.

Therefore, the detected transmission wave ① therefore has nothing to do with the ultrasonic reflected from the upper surface of the liquid, such that the detected transmission wave ① may be disregarded without the need of being referred to.

However, as shown in the graph of FIG. 17b, reflection waves are detected from a B part which is first detected after the transmission wave ①, where the B part is a part detected by the reflection waves from the upper surface of the liquid.

Therefore, a time that is consumed to detect the B part, i.e., a time taken for detecting a first returned reflection wave (B part) generated by the ultrasonic emitted by using the second ultrasonic sensor, is measured, which is then multiplied by 340 m/s, the speed of the sound, and divided by 2. This simple arithmetic can obtain a distance between the second ultrasonic sensor and the upper surface of the liquid. The reason of dividing by 2 is that the consumed time is the time reciprocated by the ultrasonic on a path.

Lastly, if a distance between the second ultrasonic sensor and the upper surface of the liquid is deducted from a predetermined perpendicular height of the receptacle accommodator, the height of the liquid to be ejected into the receptacle may be determined.

For reference, it should be apparent that the 'receptacle height' and the 'height of liquid to be ejected to the receptacle' described in the construction of the automatic liquid dispenser according to the present disclosure are all the values based on a floor surface of the receptacle accommodator.

Figure 18:
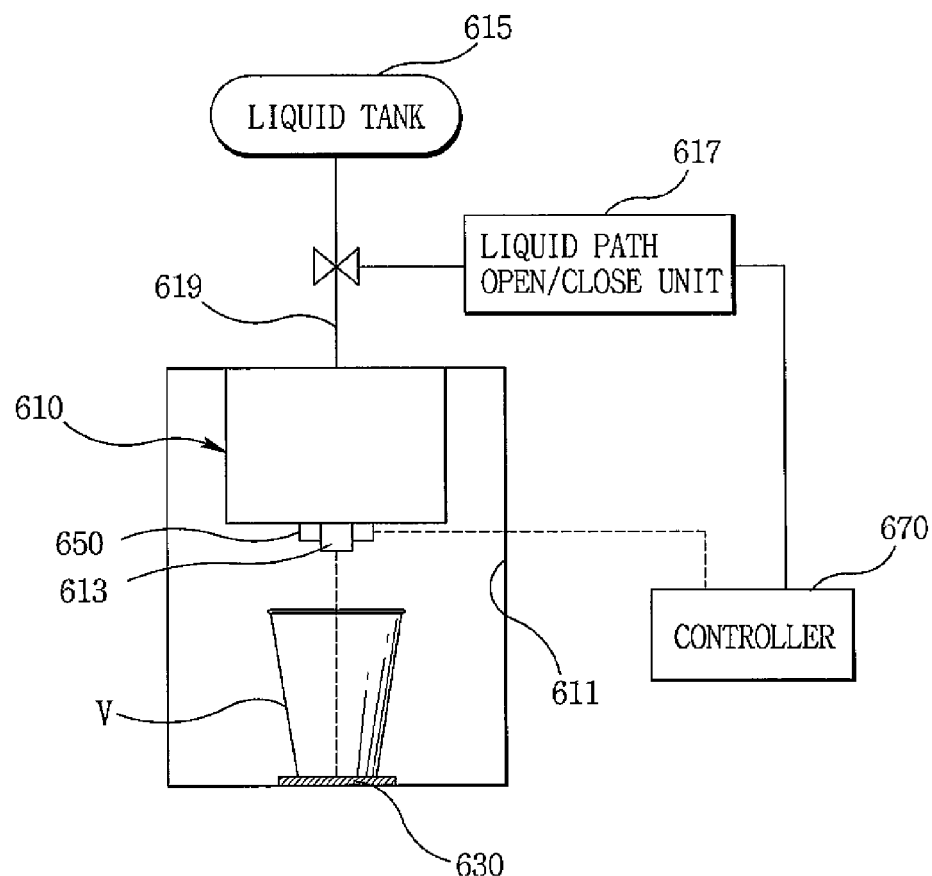
FIG. 18 is a schematic constitutional drawing illustrating an automatic liquid dispenser disposed with a receptacle arranger according to a fourth exemplary implementation.
Figure 19:
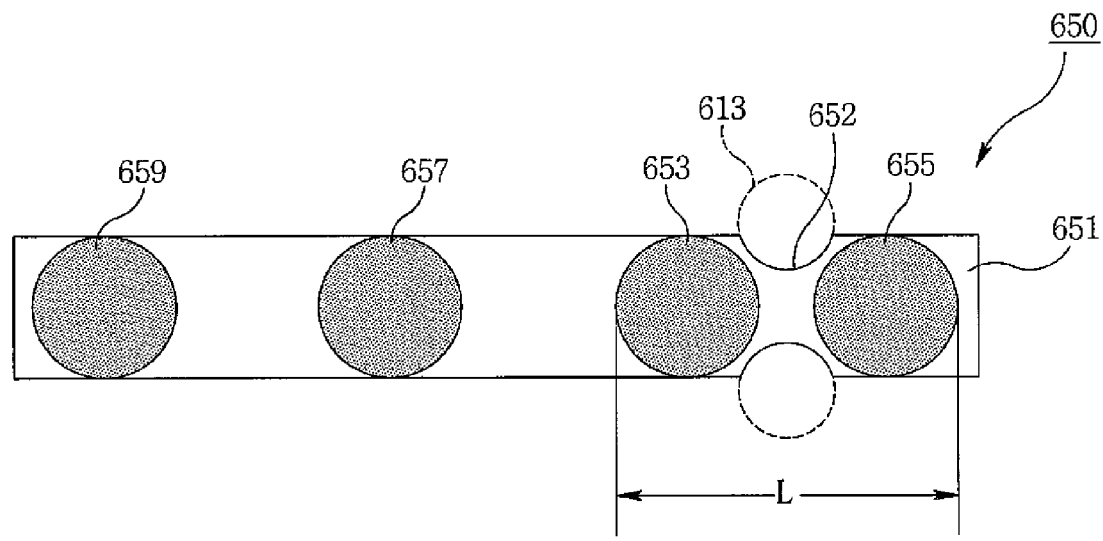
FIG. 19 is a conceptual drawing illustrating construction of a receptacle and level detector according to the fourth exemplary implementation.
Figure 20:
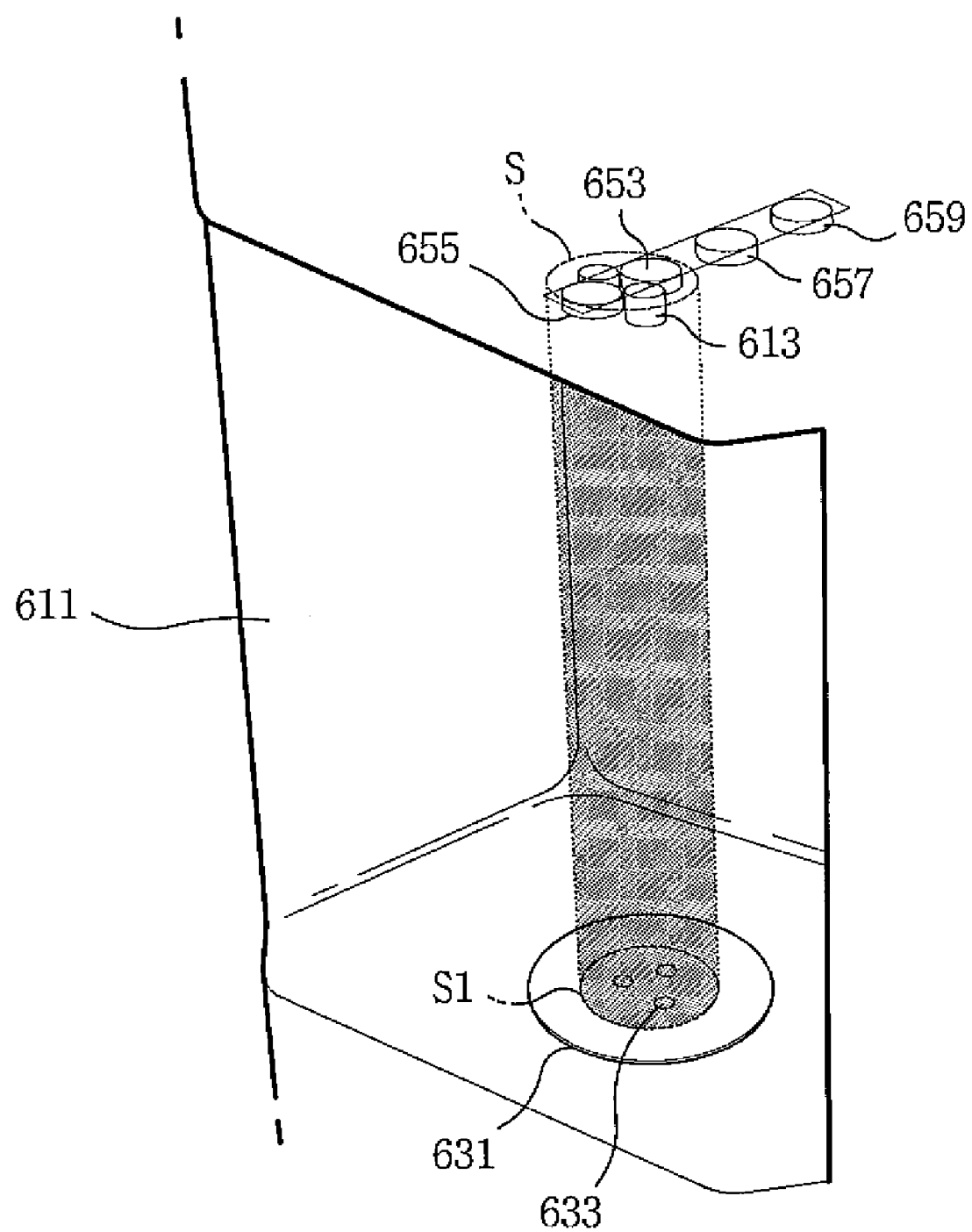
FIG. 20 is a schematic perspective view illustrating a receptacle, a level detector and a receptacle arranger according to the fourth exemplary implementation.

FIG. 18 is a schematic constitutional drawing illustrating an automatic liquid dispenser disposed with a receptacle arranger according to a fourth exemplary implementation, FIG. 19 is a conceptual drawing illustrating construction of a receptacle and a level detector according to the fourth exemplary implementation, and FIG. 20 is a schematic perspective view illustrating a receptacle, a level detector and a receptacle arranger according to the fourth exemplary implementation.

Referring to FIGS. 18, 19 and 20, the automatic liquid dispenser disposed with a receptacle arranger according to the fourth implementation includes a liquid supplier 610, a receptacle accommodator 611, a receptacle arranger 630, a receptacle and level detector 650 and a controller 670.

First, the receptacle accommodator 611 to be accommodated with a receptacle (V) is frontally open at one side thereof, and is formed therein with a flat horizontally surface for accommodating the receptacle (V). The receptacle accommodator 611 is disposed at an inner upper side thereof with the liquid supplier 610.

The liquid supplier 610 communicates with a fluid pass 619 connected to a liquid tank 615 containing liquid, and is disposed with at least one or more nozzles 613 mounted on an upper surface of the liquid accommodator 611.

A main body of a liquid path open/close unit 617 is an actuator such as a solenoid that opens and closes the fluid pas 619 in response to an electrical signal by being mounted at the fluid pass 619 communicating with the liquid tank 615 and the liquid supplier 610.

The receptacle arranger 630 is disposed at the receptacle accommodator 611 for a user to easily place a receptacle underneath the nozzle 613. Therefore, the liquid ejected from the nozzle 613 can be ejected into the receptacle placed in the receptacle accommodator 611 to thereby prevent the liquid from splashing into the automatic liquid dispenser and from dirtying the automatic liquid dispenser.

The receptacle arranger 630 is formed on the floor of the receptacle accommodator 611 as depicted in FIG. 18. Preferably, the receptacle arranger 630 includes an identifying mark 631. In other words, the identifying mark 631 is designed for a user to easily accommodate the receptacle (V) on an exact position with the naked eye.

Preferably, the identifying mark 631 is made of a tape with a colored or hologram surface, or made of a colored material that may be distinguished from the floor surface of the receptacle accommodator 611. More preferably, the identifying mark 631 has an excellent reflectivity power relative to emission of ultrasonic from the receptacle and level detector 650.

The identifying mark 631, being formed in a circular shape on which the receptacle (V) is provided, is preferably made of water-proof material for easily removing the liquid because the identifying mark 631 is disposed inside the receptacle accommodator 611 of the liquid supplier 610 which might leak the liquid.

Preferably, the receptacle arranger 630 is further disposed with at least one or more light sources 633 for the identifying mark, so that the user may easily accommodate the receptacle (V) inside the receptacle accommodator 611. In other words, the light source 633 may be turned on or off responsive to a control signal from a controller to allow the user to precisely arrange the receptacle in the receptacle arranger 630.

The light source 633 is preferably an LED (Light Emitting Diode) lamp. It should be understood however that a variety of other light sources may be employed as long as identification by a user can be made easy, and installation position of the light source is also an elective matter which is not to be restricted at all.

Although the identifying mark 631 and the light source 633 are protrusively and exaggeratedly illustrated in the drawing, with a certain height from the floor surface of the receptacle accommodator 611, this is just to clearly show the construction thereof. Actually, it is preferred that the identifying mark 631 be very thin, and the light source 633 be buried in the floor surface of the receptacle accommodator 611 to allow light to be projected therethrough.

The receptacle and level detector 650 includes a sensor module which is comprised of an ultrasonic device disposed in a PCB (Printed Circuit Board), and at least one or more reception sensors.

FIG. 19 is an exemplary conceptual drawing illustrating sensors of the receptacle and level detector 650 disposed in a PCB, where first to third ultrasonic reception sensors 655, 657, 659 and an ultrasonic device 653 are disposed in a PCB strip 651.

Preferably, a semi-arc nozzle groove 652 on the PCB strip 651 is interposed between an ultrasonic device 653 and the first ultrasonic reception sensor 655 to allow the nozzle 613 to be adjacently positioned. The second and third ultrasonic reception sensors 657, 659 are discretely disposed opposite to the first ultrasonic reception sensor 655 about the ultrasonic device 653.

As a result, the sensors 653, 655, 657, 659 of the receptacle and level detector 650 illustrated in FIG. 19 are positioned in series, but disposition of the sensors may be freely changed.

Meanwhile, in the fourth exemplary implementation, ultrasonic is emitted from the ultrasonic device 653 in order to measure the height of the receptacle (V), and the emitted ultrasonic is reflected from the receptacle (V) to be received by the first to third ultrasonic reception sensors 655, 657, 659, where the receptacle height is measured by the sensor which first receives the ultrasonic out of the three ultrasonic reception sensors 655, 657, 659.

The controller 670 receives a signal transmitted from the receptacle and level detector 650 relative to the receptacle height and controls the liquid supply to the receptacle (V).

Furthermore, when a user normally accommodates the receptacle (V) to the receptacle accommodator 611 and manipulates an automatic liquid supply functional key disposed at the automatic liquid dispenser, the controller 670 controls the receptacle and level detector 650 to open the liquid path open/close unit 617 to cope with an established value of the user.

The receptacle and level detector 650 concurrently sends the level of the liquid in the receptacle (V) to the controller 650 in real time. The controller 670 controls the liquid path open/close unit 617 to close a liquid pass 619, if it is determined that a level value determined by the signal inputted from the receptacle and level detector 650 is equal to or greater than the established value of the user, and the automatic liquid disposal is terminated if the receptacle (V) into which supply of the liquid is ended is removed.

Figure 21:
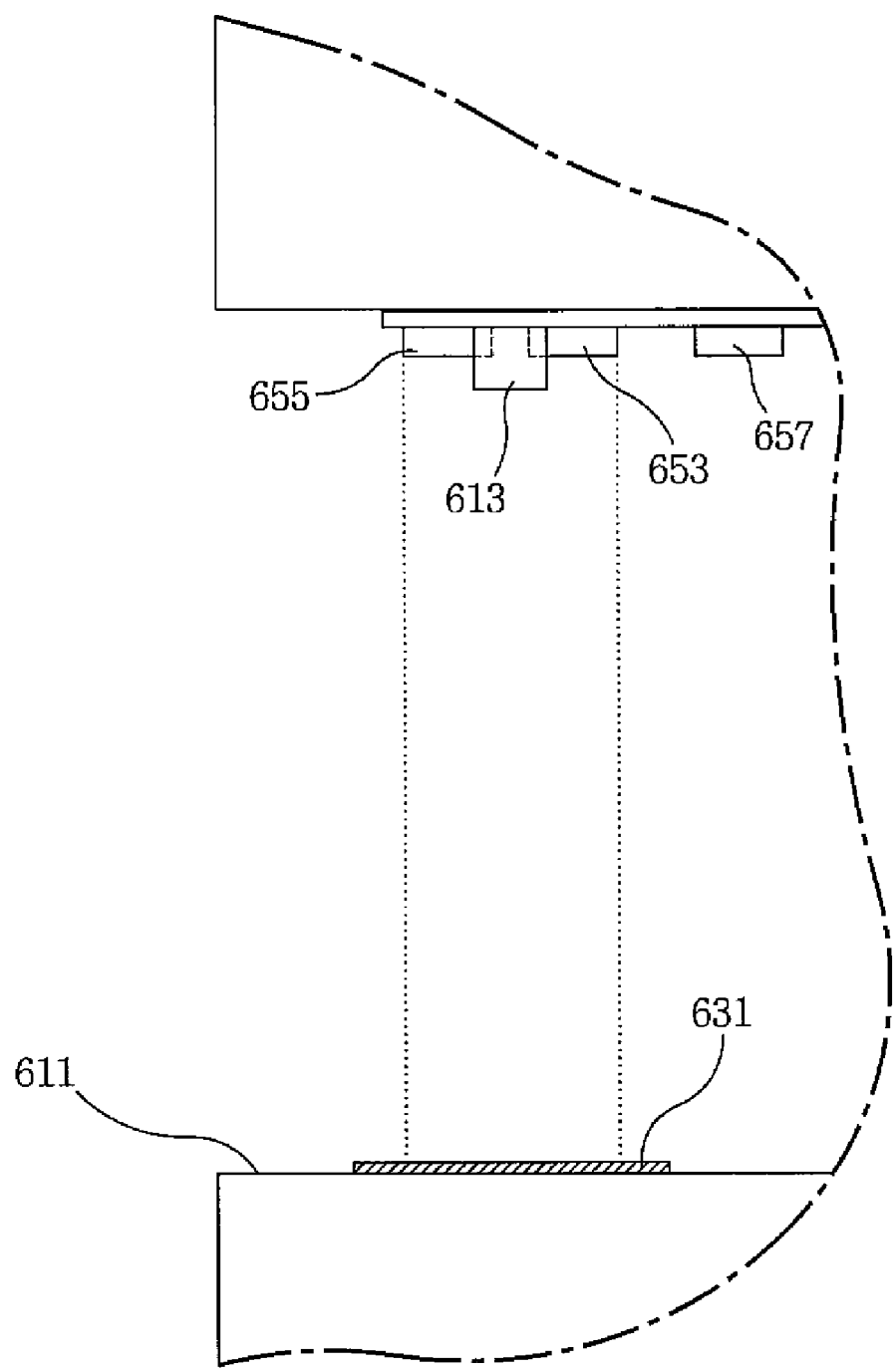
FIG. 21 is a cross-sectional view illustrating an arranged relation between a sensor module and a receptacle arranger according to the fourth exemplary implementation.

Now, referring to FIGS. 19, 20 and 21, an area of the identifying mark 631 according to the fourth exemplary implementation must be larger than an area (S) of a circle having a diameter of 'L' formed by a leftmost periphery (in the FIG. 19) of the ultrasonic device 653 and a rightmost periphery (in the FIG. 19) of the first ultrasonic reception sensor 655. In other words, as shown in FIG. 20, an area (S1) which is the same as the circular area (S) is positioned in the identifying mark 631. Preferably, the area of the identifying mark 631 is smaller than a predetermined minimum floor area of the receptacle (V). More preferably, the center of the circle having the diameter of 'L' corresponds with that of the identifying mark 631.

It should be understood that the above-described implementations are not limited by any of the details of the foregoing description. Accordingly, other implementations are within the scope of the following claims, and all changes that fall within meets and bounds of the claims, or equivalence of such meets and bounds are therefore intended to be embraced by the claims.

As apparent from the foregoing, the above-disclosed technique has an advantage in that ultrasonic is sent to an upper surface of a receptacle, and the ultrasonic reflected from the upper surface of the receptacle is received to detect a receptacle height, whereby the receptacle height may be freely detected regardless of shape, material and surface state of the receptacle, and regardless of a position where the receptacle is placed.

Another advantage is that ultrasonic is used to reduce a manufacturing cost of an automatic liquid dispenser compared with that of using light.

Still another advantage is that a receptacle arranger capable of precisely arranging a receptacle under a nozzle in a receptacle accommodator is employed such that liquid ejected from the nozzle may be inputted only into the receptacle placed on the receptacle accommodator to thereby prevent the liquid from being splashed.

What is claimed is:

1. An automatic liquid dispenser comprising:
  a receptacle height measurer generating a first ultrasonic signal onto an upper surface of a receptacle and receiving the first ultrasonic signal reflected from the upper surface of the receptacle to generate a signal;
  a liquid level detector generating a second ultrasonic signal having a mutually different frequency from that of the first ultrasonic signal to a content inside the receptacle, and receiving the second ultrasonic signal reflected from the content to generate a signal;
  a liquid ejector ejecting liquid into the receptacle; and
  a controller controlling the liquid ejector using the signals generated by the receptacle height measurer and the liquid level detector.

2. The automatic liquid dispenser as claimed in claim 1, wherein the receptacle height measurer and the liquid level detector comprise at least one or more ultrasonic devices for emitting the first ultrasonic signal or the second ultrasonic signal and at least more than two second ultrasonic devices for receiving the first ultrasonic signal or the second ultrasonic signal.

3. The automatic liquid dispenser as claimed in claim 1, wherein each of the receptacle height measurer and the liquid level detector respectively comprise one first ultrasonic device for emitting the first ultrasonic signal or the second ultrasonic signal and three second ultrasonic devices for receiving the first ultrasonic signal or the second ultrasonic signal.

4. The automatic liquid dispenser as claimed in claim 2, wherein any one of the first ultrasonic devices and the second ultrasonic devices includes a noise absorbing material.

5. The automatic liquid dispenser as claimed in claim 2, wherein the second ultrasonic devices are formed in mutually different positions from the liquid ejector.

6. The automatic liquid dispenser as claimed in claim 2, wherein the first ultrasonic device is formed nearest to the liquid ejector.

7. The automatic liquid dispenser as claimed in claim 5, wherein the level of liquid is detected by a signal received from one of the second ultrasonic devices that is the nearest to the liquid ejector among the second ultrasonic devices.

8. The automatic liquid dispenser as claimed in claim 2, wherein a gain value of one of the second ultrasonic devices is set to be lower than gain values of remaining second ultrasonic devices.

9. The automatic liquid dispenser as claimed in claim 1, further comprising a receptacle detector for detecting the receptacle.

10. The automatic liquid dispenser as claimed in claim 2, wherein a beam angle of the first ultrasonic device is in the range of approximately 60-150 degrees.

11. The automatic liquid dispenser as claimed in claim 1, wherein a measurement band of the receptacle height measurer and/or the liquid level measurer is in the range of approximately 2 cm-1 meter.

12. The automatic liquid dispenser as claimed in claim 1, wherein a measurement band of the receptacle height measurer and/or the liquid level measurer is in the range of approximately 2 cm-60 cm.

13. The automatic liquid dispenser as claimed in claim 1, further comprising an input unit for inputting a level of liquid to be ejected into the receptacle.

14. The automatic liquid dispenser as claimed in claim 1, wherein when the level value of liquid relative to a pre-stored receptacle height is higher than the level value of liquid relative to a receptacle height detected by the receptacle height measurer and the level detector, the controller outputs a control signal to the liquid ejector to end the liquid ejection of the liquid ejector.

15. The automatic liquid dispenser as claimed in claim 1, further comprising a receptacle accommodator to receive the receptacle therein.

16. The automatic liquid dispenser as claimed in claim 15, wherein the receptacle accommodator comprises a marker for marking a receptacle accommodation point.

17. The automatic liquid dispenser as claimed in claim 16, wherein the receptacle height measurer and the level detector comprise a first ultrasonic device and at least two or more second ultrasonic devices, and the marker is formed perpendicularly or substantially perpendicularly below the first ultrasonic device.

18. The automatic liquid dispenser as claimed in claim 16, wherein the receptacle height measurer and the level detector respectively comprise first ultrasonic devices for emitting the first ultrasonic signal or the second ultrasonic signal and at least two or more second ultrasonic devices, and the marker is formed perpendicularly or substantially perpendicularly below any one of the second ultrasonic devices.

19. The automatic liquid dispenser as claimed in claim 16, wherein the marker is formed perpendicularly beneath the liquid ejector.

20. The automatic liquid dispenser as claimed in claim 16, wherein the receptacle height measurer and the level detector include at least one or more first ultrasonic devices and at least two or more second ultrasonic devices, and the marker has a radius of 80-150% of a radius of a circle including any one of the first ultrasonic devices, the liquid ejector and the second ultrasonic device.

21. An automatic liquid dispensing method comprising:
    emitting a first ultrasonic signal to an upper surface of a receptacle and receiving the first ultrasonic signal reflected from the upper surface of the receptacle to determine a receptacle height;
    ejecting liquid into the receptacle;
    generating a second ultrasonic signal having a mutually different frequency from that of the first ultrasonic signal to an upper surface of the liquid inside the receptacle, and receiving the second ultrasonic signal reflected from the upper surface of the liquid to determine a liquid level in the receptacle; and
    stopping the liquid ejection if the determined liquid level reaches a predetermined value.

22. The automatic liquid dispensing method as claimed in claim 21, wherein the step of stopping the liquid ejection is performed based on a comparison between a pre-stored liquid level value relative to a receptacle height and the determined liquid level value relative to the determined receptacle height.

23. The automatic liquid dispensing method as claimed in claim 21, further comprising:
    detecting whether the receptacle is present or absent.

24. The automatic liquid dispensing method as claimed in claim 21, wherein the receptacle height and the liquid level are determined based on an average value of receptacle heights and liquid levels obtained by repeating the determination at least twice.

25. The automatic liquid dispensing method as claimed in claim 21, wherein the receptacle height is determined based on signals of at least two differently-located ultrasonic reception sensors.

26. The automatic liquid dispensing method as claimed in claim 25, wherein the liquid level is determined based on a signal of an ultrasonic reception sensor nearest to a liquid ejector among a plurality of ultrasonic reception sensors.

27. The automatic liquid dispensing method as claimed in claim 21, further comprising:
    determining a liquid level desired by a user.

28. The automatic liquid dispenser as claimed in claim 1, wherein the receptacle height measurer is a first ultrasonic sensor,
    wherein the liquid level detector is a second ultrasonic sensor, and
    wherein the controller comprises:
    a receptacle height determiner determining the receptacle height by the signal generated by the first ultrasonic sensor;
    a liquid ejection height determiner determining the height of liquid ejectionable to the receptacle based on the receptacle height determined by the receptacle height determiner;
    a liquid height determiner determining the height of liquid to be ejected to the receptacle based on the signal generated by the second ultrasonic sensor; and
    a liquid ejection control unit stopping the liquid ejection by the liquid ejector if the liquid height determined by the liquid height determiner is higher than the height of liquid that is ejectable into the receptacle.

29. The automatic liquid dispenser as claimed in claim 28, wherein the first ultrasonic sensor has a larger detection angle than that of the second ultrasonic sensor.

30. The automatic liquid dispenser as claimed in claim 28, wherein a detection angle of the first ultrasonic sensor is in the range of 60-120 degrees, while a detection angle of the second ultrasonic sensor is in the range of 30-60 degrees.

\* \* \* \* \*